United States Patent
Islam et al.

(10) Patent No.: US 11,039,499 B2
(45) Date of Patent: Jun. 15, 2021

(54) DISCONTINUOUS RECEPTION WAKE UP PROCEDURES

(71) Applicant: QUALCOMM Incorporated, San Diego, CA (US)

(72) Inventors: Muhammad Nazmul Islam, Edison, NJ (US); Ashwin Sampath, Skillman, NJ (US); Sundar Subramanian, San Diego, CA (US); Juergen Cezanne, Ocean Township, NJ (US); Sumeeth Nagaraja, San Diego, CA (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 16/033,013

(22) Filed: Jul. 11, 2018

(65) Prior Publication Data
US 2019/0053320 A1   Feb. 14, 2019

Related U.S. Application Data

(60) Provisional application No. 62/544,729, filed on Aug. 11, 2017.

(51) Int. Cl.
*H04W 56/00* (2009.01)
*H04W 76/28* (2018.01)
(Continued)

(52) U.S. Cl.
CPC .......... *H04W 76/28* (2018.02); *H04B 7/0617* (2013.01); *H04B 7/0695* (2013.01);
(Continued)

(58) Field of Classification Search
CPC ............ H04W 76/28; H04W 52/0048; H04W 72/042; H04W 72/046; H04W 56/001; H04L 5/0048
(Continued)

(56) References Cited

U.S. PATENT DOCUMENTS 9,247,563 B2   1/2016   Anderson et al.
9,775,183 B2   9/2017   Miklos et al.
(Continued)

FOREIGN PATENT DOCUMENTS

EP          3337055 A1    6/2018
WO     WO-2017083514 A1   5/2017
(Continued)

OTHER PUBLICATIONS

Ericsson: "Beam Management in C-DRX," 3GPP Draft; R1-1708681, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051273864, 2 pages, Retrieved from the Internet: URL: http://www.3gpp.org/ftp/Meetings_3GPP_SYNC/RAN1/Docs/ [retrieved on May 14, 2017].
(Continued)

*Primary Examiner* — Sai Ming Chan
(74) *Attorney, Agent, or Firm* — Linda G. Gunderson

(57) ABSTRACT

Methods, systems, and devices for wireless communication are described for discontinuous reception (DRX) wake up procedures over millimeter wave (mmW) frequency resources. A base station may use multiple antenna ports to transmit one or more beamformed downlink transmissions to a user equipment (UE). The downlink transmissions may include beam-swept reference signals, and the UE may initiate a wake up procedure prior to a configured DRX-On cycle to receive the reference signals. Based on the reception of the reference signals, the UE may train a set of receive beams and determine a preferred downlink transmit beam. The base station may subsequently transmit at least a portion of a cell radio network temporary identifier (C-RNTI) in a beam-swept manner, and the UE may evaluate the C-RNTI transmission on the preferred transmit beam. The UE may
(Continued)

also transmit an uplink response indicating the preferred transmit beam to receive downlink data.

28 Claims, 18 Drawing Sheets

(51) Int. Cl.
| | | |
|---|---|---|
| *H04L 5/00* | (2006.01) | |
| *H04W 52/02* | (2009.01) | |
| *H04B 7/06* | (2006.01) | |
| *H04B 7/08* | (2006.01) | |
| *H04W 72/04* | (2009.01) | |
| *H04W 16/28* | (2009.01) | |

(52) U.S. Cl.
CPC .......... *H04B 7/088* (2013.01); *H04L 5/0025* (2013.01); *H04L 5/0048* (2013.01); *H04L 5/0053* (2013.01); *H04L 5/0094* (2013.01); *H04W 52/0209* (2013.01); *H04W 52/0216* (2013.01); *H04W 52/0229* (2013.01); *H04W 72/042* (2013.01); *H04W 72/046* (2013.01); *H04W 16/28* (2013.01); *H04W 56/001* (2013.01)

(58) Field of Classification Search
USPC ......................................................... 370/311
See application file for complete search history.

(56) References Cited

U.S. PATENT DOCUMENTS

| | | | | |
|---|---|---|---|---|
| 2012/0275366 | A1* | 11/2012 | Anderson | ........... H04W 68/025 370/311 |
| 2015/0016361 | A1* | 1/2015 | Kim | ....................... H04J 11/004 370/329 |
| 2017/0230869 | A1 | 8/2017 | Kubota et al. | |
| 2017/0251518 | A1* | 8/2017 | Agiwal | ................. H04W 76/28 |
| 2017/0273058 | A1* | 9/2017 | Agiwal | ................ H04B 7/0617 |
| 2018/0049124 | A1 | 2/2018 | Yi et al. | |
| 2018/0167883 | A1* | 6/2018 | Guo | ..................... H04B 7/0617 |
| 2018/0310283 | A1* | 10/2018 | Deenoo | ............... H04W 72/046 |
| 2019/0215119 | A1* | 7/2019 | Kim | ....................... H04L 1/0027 |

FOREIGN PATENT DOCUMENTS

| | | |
|---|---|---|
| WO | WO2017167755 A1 | 10/2017 |
| WO | WO2017192018 A1 | 11/2017 |

OTHER PUBLICATIONS

International Search Report and Written Opinion—PCT/US2018/042055—ISA/EPO—dated Oct. 8, 2018.

MCC Support: "Draft Report of 3GPP TSG RAN WG1 #89, V0.2.0," 3GPP Draft; Draft_Minutes_Report_RAN1#89_V020, 3rd Generation Partnership Project (3GPP), Mobile Competence Centre; 650, Route Des Lucioles; F-06921 Sophia-Antipolis Cedex; France, vol. RAN WG1, No. Prague, Czech; Aug. 21, 2017-Aug. 25, 2017, Jun. 26, 2017, XP051299099, 166 pages, Retrieved from the Internet: URL: http://www.3gpp.org/ftp/Meetings_3GPP_SYNC/RAN1/Docs/ [retrieved on Jun. 26, 2017].

* cited by examiner

DISCONTINUOUS RECEPTION WAKE UP PROCEDURES

CROSS REFERENCES

The present application for patent claims the benefit of U.S. Provisional Patent Application No. 62/544,729 by Islam et al., entitled "Discontinuous Reception Wake Up Procedures," filed Aug. 11, 2017, assigned to the assignee hereof, and expressly incorporated by reference in its entirety.

BACKGROUND

The following relates generally to wireless communication, and more specifically to discontinuous reception wake up procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 gigahertz (GHz), 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a connected DRX (C-DRX) mode) where the UE transitions between an active state (e.g., where the UE wakes up to determine if data is available for the UE) and a sleep state (e.g., where the UE shuts down various hardware/processes to conserve power). The UE may determine if data is available by monitoring a control channel, such as a physical downlink control channel (PDCCH). The PDCCH may carry or otherwise convey an indication that the base station has data ready to transmit to the UE. In a mmW wireless communication system, the mmW base station (e.g., a next generation nodeB (gNB)) may need to beam sweep the PDCCH transmissions to mitigate high path losses associated with mmW transmissions. This may result in the UE attempting to decode the PDCCH multiple times and/or wake up for a longer time period to receive and decode the PDCCH transmissions and/or allow for beam management. Power consumption at the UE using such techniques may be high.

SUMMARY

The described techniques relate to improved methods, systems, devices, or apparatuses that support discontinuous reception (DRX) wake up procedures. Generally, the described techniques provide for the transmission of a beam-swept cell radio network temporary identifier (C-RNTI) to a user equipment (UE) in a sleep state of a DRX mode. For example, a base station may transmit a set of signals (e.g., reference signals, synchronization signals, etc.) using a beam sweeping configuration. The base station may then transmit, for example, using the same beam sweeping configuration, a control channel (e.g., a physical downlink control channel (PDCCH)) that indicates at least a part of a C-RNTI for a UE that is scheduled to receive data. For example, a cyclic redundancy check (CRC) of the control channel may be scrambled by the indicated C-RNTI. In such cases, the beams used for the transmission of the C-RNTI and the beams used for transmitting the set of signals (e.g., reference signals, synchronization signals, etc.) may be quasi co-located. The UE may wake up early from a sleep state of the DRX mode (e.g., prior to a scheduled active state (e.g., an on duration)) and receive the beam-swept set of signals. Additionally, the UE may perform beam training for a set of receive beams, and further identify a beam on which to monitor for the C-RNTI, for example, based on a signal strength, signal quality, signal to interference plus noise ratio (SINR), etc., of the received set of signals. Because the beams used for the beam-swept C-RNTI may be quasi co-located with the beams used for the preceding signal transmission, the UE may efficiently identify the strongest beam on which to receive the C-RNTI. As a result, the UE may save power that may have otherwise been used for decoding respective control channels on multiple beams, thereby reducing energy consumption at the UE and enhancing DRX procedures for receiving data while in a sleep state.

A method of wireless communication is described. The method may include receiving, while operating in a DRX mode, a control channel that indicates at least a portion of a C-RNTI of a UE, the control channel transmitted by a base station using a beam sweeping configuration, selecting, by the UE, a downlink transmit beam of the base station based on the received control channel, and transmitting an indication of the selected downlink transmit beam to the base station.

An apparatus for wireless communication is described. The apparatus may include means for receiving, while operating in a DRX mode, a control channel that indicates at least a portion of a C-RNTI of a UE, the control channel transmitted by a base station using a beam sweeping configuration, means for selecting, by the UE, a downlink transmit beam of the base station based on the received control channel, and means for transmitting an indication of the selected downlink transmit beam to the base station.

Another apparatus for wireless communication is described. The apparatus may include a processor, memory in electronic communication with the processor, and instructions stored in the memory. The instructions may be operable to cause the processor to receive, while operating in a DRX mode, a control channel that indicates at least a portion of a C-RNTI of a UE, the control channel transmitted by a base station using a beam sweeping configuration, select, by the UE, a downlink transmit beam of the base station based on the received control channel, and transmit an indication of the selected downlink transmit beam to the base station.

A non-transitory computer readable medium for wireless communication is described. The non-transitory computer-readable medium may include instructions operable to cause a processor to receive, while operating in a DRX mode, a control channel that indicates at least a portion of a C-RNTI of the UE, the control channel transmitted by a base station using a beam sweeping configuration, select, by the UE, a downlink transmit beam of the base station based on the received control channel, and transmit an indication of the selected downlink transmit beam to the base station.

Some examples of the method, apparatus, and non-transitory computer-readable medium described above may further include processes, features, means, or instructions for receiving a set of signals from the base station while operating in the DRX mode, the set of signals including one or more reference signals, or one or more synchronization signals, or a combination thereof, where receiving the control channel may be based on receiving the set of signals.

Some examples of the method, apparatus, and non-transitory computer-readable medium described above may further include processes, features, means, or instructions for waking from a sleep state prior to a scheduled active state of the DRX mode, where the set of signals may be received from the base station upon waking from the sleep state. Some examples of the method, apparatus, and non-transitory computer-readable medium described above may further include processes, features, means, or instructions for identifying a receive beam for the UE to use to receive the control channel based on the received set of signals from the base station.

In some examples of the method, apparatus, and non-transitory computer-readable medium described above, the one or more synchronization signals include a primary synchronization signal (PSS), or a secondary synchronization signal (SSS), or a combination thereof. In some examples of the method, apparatus, and non-transitory computer-readable medium described above, the one or more reference signals include a demodulation reference signal (DMRS), or a channel state information reference signal (CSI-RS), or a combination thereof.

Some examples of the method, apparatus, and non-transitory computer-readable medium described above may further include processes, features, means, or instructions for training a set of receive beams while receiving the set of signals. Some examples of the method, apparatus, and non-transitory computer-readable medium described above may further include processes, features, means, or instructions for training the set of receive beams while receiving the set of signals over multiple symbol periods.

Some examples of the method, apparatus, and non-transitory computer-readable medium described above may further include processes, features, means, or instructions for receiving an indication of a cell-specific configuration for the set of signals, the indication received via a master information block (MIB), or a minimum system information block (MSIB), or remaining minimum system information (RMSI), or a combination thereof.

Some examples of the method, apparatus, and non-transitory computer-readable medium described above may further include processes, features, means, or instructions for receiving an indication of a UE-specific configuration for the set of signals, the indication received via a PDCCH, or a physical downlink shared channel (PDSCH), or a radio resource control (RRC) message, or a combination thereof.

In some examples of the method, apparatus, and non-transitory computer-readable medium described above, receiving the control channel includes: receiving a PDCCH including at least a portion of the C-RNTI, the PDCCH transmitted using the beam sweeping configuration. Some examples of the method, apparatus, and non-transitory computer-readable medium described above may further include processes, features, means, or instructions for identifying a C-RNTI of the UE. Some examples of the method, apparatus, and non-transitory computer-readable medium described above may further include processes, features, means, or instructions for decoding the PDCCH using the C-RNTI. In some examples of the method, apparatus, and non-transitory computer-readable medium described above, CRC bits of the PDCCH may be scrambled based on the C-RNTI.

Some examples of the method, apparatus, and non-transitory computer-readable medium described above may further include processes, features, means, or instructions for identifying the C-RNTI in a payload of the PDCCH. Some examples of the method, apparatus, and non-transitory computer-readable medium described above may further include processes, features, means, or instructions for receiving a PDSCH including at least a portion of the C-RNTI, the PDSCH transmitted using the beam sweeping configuration.

Some examples of the method, apparatus, and non-transitory computer-readable medium described above may further include processes, features, means, or instructions for receiving, as part of the control channel, a bit that indicates a presence of downlink data for the UE. Some examples of the method, apparatus, and non-transitory computer-readable medium described above may further include processes, features, means, or instructions for receiving, from the base station, downlink data over the downlink transmit beam. In some examples of the method, apparatus, and non-transitory computer-readable medium described above, the indication of the downlink transmit beam includes a beam recovery signal.

A method of wireless communication is described. The method may include identifying that data is available to be transmitted to a UE that is operating in a DRX mode, identifying a cell radio network temporary identifier (C-RNTI) of the UE, and transmitting, to the UE, a control channel that indicates at least a portion of the identified C-RNTI using the beam sweeping configuration.

An apparatus for wireless communication is described. The apparatus may include means for identifying that data is available to be transmitted to a user equipment (UE) that is operating in a DRX mode, means for identifying a cell radio network temporary identifier (C-RNTI) of the UE, and means for transmitting, to the UE, a control channel that indicates at least a portion of the identified C-RNTI using the beam sweeping configuration.

Another apparatus for wireless communication is described. The apparatus may include a processor, memory in electronic communication with the processor, and instructions stored in the memory. The instructions may be operable to cause the processor to identify that data is available to be transmitted to a UE that is operating in a DRX mode, identify a C-RNTI of the UE, and transmit, to the UE, a control channel that indicates at least a portion of the identified C-RNTI using the beam sweeping configuration.

A non-transitory computer readable medium for wireless communication is described. The non-transitory computer-readable medium may include instructions operable to cause a processor to identify that data is available to be transmitted to a UE that is operating in a DRX mode, identify a C-RNTI of the UE, and transmit, to the UE, a control channel that indicates at least a portion of the identified C-RNTI using the beam sweeping configuration.

In some examples of the method, apparatus, and non-transitory computer-readable medium described above, transmitting the control channel includes: transmitting the control channel that indicates all of the identified C-RNTI to the UE using the beam sweeping configuration. In some examples of the method, apparatus, and non-transitory computer-readable medium described above, transmitting the control channel includes: transmitting the control channel using a first set of antenna ports that may be spatially quasi co-located with a second set of antenna ports used for transmitting the set of signals.

Some examples of the method, apparatus, and non-transitory computer-readable medium described above may further include processes, features, means, or instructions for transmitting, to the UE, a set of signals using the beam sweeping configuration, the set of signals including one or more reference signals, or one or more synchronization signals, or a combination thereof. Some examples of the method, apparatus, and non-transitory computer-readable medium described above may further include processes, features, means, or instructions for configuring the one or more reference signals as cell-specific reference signals, or UE-specific reference signals, or a combination thereof.

Some examples of the method, apparatus, and non-transitory computer-readable medium described above may further include processes, features, means, or instructions for transmitting an indication of a cell-specific configuration for the set of signals, the indication transmitted using a master information block (MIB), or a minimum system information block (MSIB), or remaining minimum system information (RMSI), or a combination thereof.

Some examples of the method, apparatus, and non-transitory computer-readable medium described above may further include processes, features, means, or instructions for transmitting an indication of a UE-specific configuration for the set of signals, the indication transmitted using a PDCCH, or a PDSCH, or a RRC message, or a combination thereof.

In some examples of the method, apparatus, and non-transitory computer-readable medium described above, the one or more reference signals include a DMRS, or a CSI-RS, or a combination thereof. In some examples of the method, apparatus, and non-transitory computer-readable medium described above, the one or more synchronization signals PSS, or an SSS, or a combination thereof.

Some examples of the method, apparatus, and non-transitory computer-readable medium described above may further include processes, features, means, or instructions for receiving, from the UE, an indication of a selected downlink transmit beam for transmitting downlink data. Some examples of the method, apparatus, and non-transitory computer-readable medium described above may further include processes, features, means, or instructions for transmitting the downlink data using the selected downlink transmit beam. In some examples of the method, apparatus, and non-transitory computer-readable medium described above, transmitting the control channel includes: transmitting a PDCCH including at least a portion of the C-RNTI, the PDCCH transmitted using the beam sweeping configuration.

Some examples of the method, apparatus, and non-transitory computer-readable medium described above may further include processes, features, means, or instructions for encoding the PDCCH using the C-RNTI. Some examples of the method, apparatus, and non-transitory computer-readable medium described above may further include processes, features, means, or instructions for including the C-RNTI in a payload of the PDCCH.

Some examples of the method, apparatus, and non-transitory computer-readable medium described above may further include processes, features, means, or instructions for transmitting a PDSCH including at least a portion of the C-RNTI, the PDSCH transmitted using the beam sweeping configuration. Some examples of the method, apparatus, and non-transitory computer-readable medium described above may further include processes, features, means, or instructions for transmitting, as part of the control channel, a bit that indicates a presence of downlink data for the UE.

DETAILED DESCRIPTION

Figure 1:
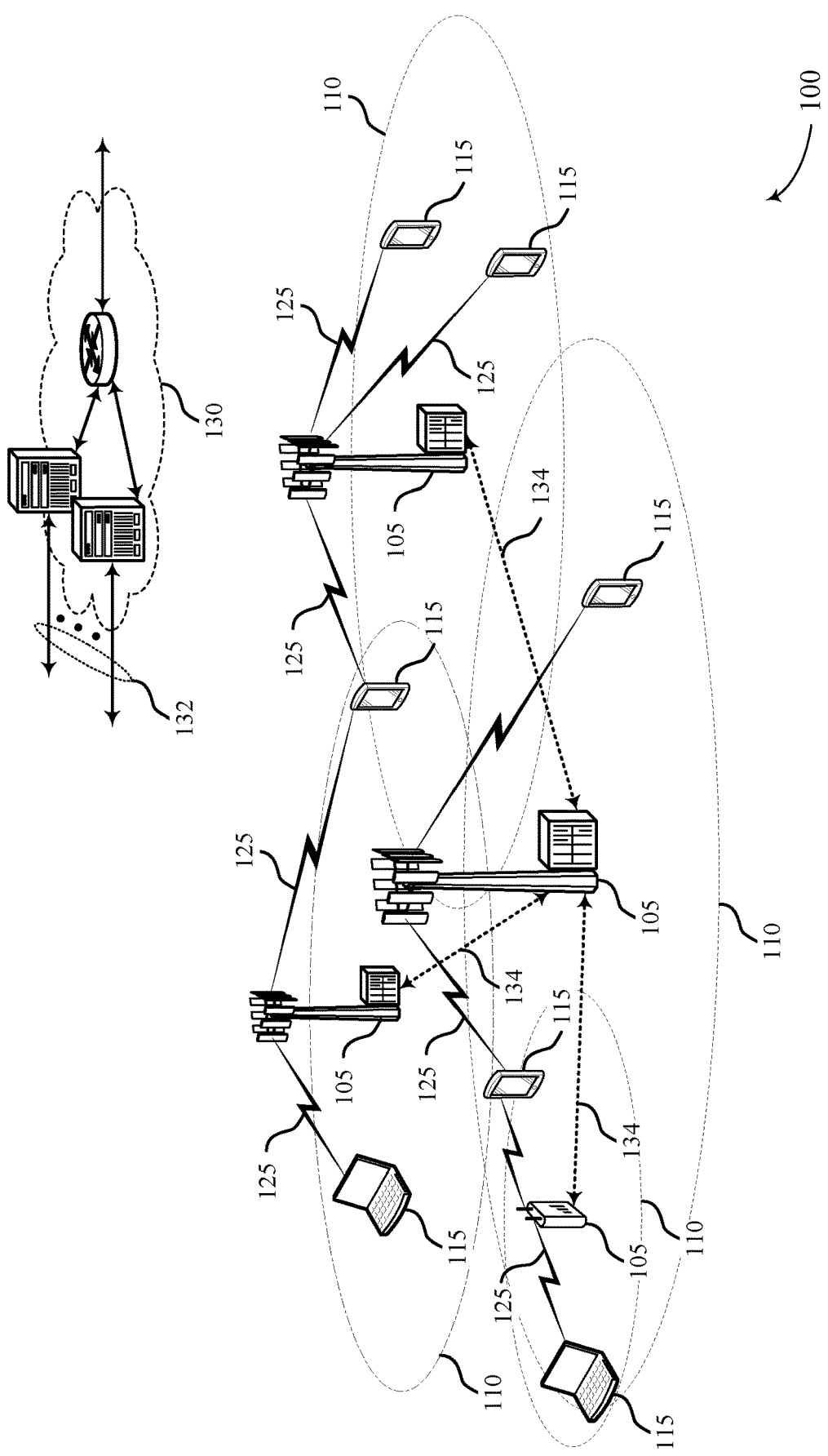
FIG. 1 illustrates an example of a wireless communications system in accordance with aspects of the present disclosure.

A wireless device may implement a discontinuous reception (DRX) cycle (e.g., when operating in a DRX mode) to enable the efficient use of battery power for reception of downlink transmissions. A base station and a user equipment (UE) may establish a radio resource control (RRC) connection and the UE may enter a sleep state when not actively communicating. For example, during RRC connection establishment, a DRX configuration, including a DRX-On cycle and DRX-Off cycle duration, may be configured in an RRC connection setup request or an RRC connection reconfiguration request. The DRX configuration may determine how frequently the UE is scheduled to wake up and receive downlink data in accordance with the configured DRX cycle durations. The UE may wake up during a DRX-On duration, and monitor one or more physical downlink control channel (PDCCH) subframes for downlink control information (DCI) designated for the UE, including a radio network temporary identifier (RNTI) (e.g., a cell-specific RNTI (C-RNTI), and subsequent physical downlink shared channel (PDSCH) transmissions.

Some wireless communications systems may support beamformed transmissions between the base station and the UE. For instance, a wireless communications system may operate in millimeter wave (mmW) frequency ranges (e.g., 28 gigahertz (GHz), 40 GHz, 60 GHz, etc.). Wireless communications at mmW frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A base station may use a number of antenna ports associated with arrays of antennas for emitting one or more beam reference signals (BRSs) for beamformed downlink transmissions. Similarly, a UE may utilize beamforming for emitting directional receive beams of the UE and for uplink transmission to the base station. Accordingly, during connection establishment between the UE and base station, both the UE and base station may use beamforming techniques for reference signal and PDCCH reception and transmission, respectively. In particular, the base station may replicate the PDCCH transmission for each beam reference signal (BRS) of a downlink beam sweep.

Beamformed data transmission and reception between the UE and base station, in accordance with a DRX configuration at the UE, may include procedures to evaluate control information prior to a DRX-On cycle and perform transmit beam selection. For example, the base station may transmit one or more beam-swept reference signals to the UE as a preemptive indication for a subsequent beam-swept C-RNTI transmission. The reference signals may provide a reference point for downlink power over channel resources. In some cases, each of the reference signals may contain one or more synchronization signal (SS) bursts, channel state information reference signal (CSI-RS) bursts, or both. In other cases, each of the reference signals may contain one or more SS bursts with (e.g., followed by) a subsequent beam-swept paging transmission distinct from a CSI-RS transmission and quasi co-located (QCLed) with the antenna resources of the one or more SS bursts.

As a result, the UE may initiate a wake up procedure prior to a configured DRX-On cycle to receive the one or more beam-swept reference signal transmissions. Based on the reference signal transmissions, the UE may train a set of receive beams for subsequent C-RNTI transmission and determine a transmit beam (e.g., a single transmit beam) of the downlink beam sweep for reception and decoding. By evaluating the C-RNTI transmission on a downlink transmit beam, the UE may avoid excessive wake up procedures or extended durations spent awake for repeated PDCCH decoding attempts over multiple transmit beams of the downlink beam sweep. Accordingly, the base station may perform beam-swept transmission of at least a portion of the C-RNTI associated with the UE via antenna ports QCLed with the antenna resources of the preceding reference signal transmissions. The transmission may include a beam-swept transmission of a single on/off bit signal indicating whether downlink data is scheduled for the UE. The UE may receive the beamformed C-RNTI and on/off bit transmission over system resources, decode or detect the C-RNTI value of the transmission on the selected transmit beam, and attempt to decode the received C-RNTI information. The UE may then use the decoding to evaluate the transmission and determine if subsequent downlink data exists. The UE may then send an uplink response (e.g., a beam recovery signal) to the base station that includes, for example, an indication of a preferred downlink transmit beam.

The base station may receive the uplink response from the UE and identify the UE-selected downlink transmit beam. In some cases, the base station may receive the beam recovery signal within a symbol period of the received uplink response. Based on the symbol period of the received signal, the base station may identify the transmit beam for downlink data transmission. That is, the UE may identify the selected transmit beam by transmitting the beam recovery signal within a particular one of the symbol periods selected by the UE, where the base station and the UE both understand the relationship or mapping between the symbol period of the beam recovery signal and a transmit beam for data transmissions corresponding to the symbol period. The base station may then directly transmit the downlink data over the single transmit beam. The UE may receive and interpret the downlink data synchronously to the scheduled DRX-On cycle duration, which may allow the UE to perform a single interpretation of the downlink data information. The described techniques may allow for improved message throughput between the UE and the base station. Additionally, through the use of a beam-swept C-RNTI from the base station, the UE may refrain from excess power consumption in decoding multiple control channel transmissions over multiple beams, thereby enhancing power savings at the UE and extending battery life.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. Process flows illustrating aspects of the disclosure are also described. Aspects of the disclosure are further illustrated by and described with reference to apparatus diagrams, system diagrams, and flowcharts that relate to discontinuous reception wake up procedures.

FIG. 1 illustrates an example of a wireless communications system 100 in accordance with aspects of the present disclosure. Wireless communications system 100 includes base stations 105, UEs 115, and a core network 130. In some examples, wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems, such as an NR system, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

PDCCH carries DCI in control channel elements (CCEs), which may consist of nine logically contiguous resource element groups (REGs), where each REG contains four resource elements (REs). DCI includes information regarding downlink scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the UE 115, a limited set of control channel element (CCE) locations can be specified for DCI associated with a specific UE 115. CCEs may be grouped (e.g., in groups of 1, 2, 4 and 8 CCEs), and a set of CCE locations in which the UE 115 may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information. CCEs may be indexed, and the common search space may start from, for example, CCE 0. The starting index for a UE-specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI and perform a CRC check to determine whether the attempt was successful.

Synchronization (e.g., cell acquisition) may be performed using synchronization signals or channels transmitted by a network entity (e.g., a base station 105). In some cases, a base station 105 may transmit synchronization signal (SS) blocks (which may be referred to as SS bursts) containing discovery reference signals. For example, SS blocks may include a primary synchronization signal (PSS), a secondary synchronization signal (SSS), a physical broadcast channel (PBCH), or other synchronization signals (e.g., a tertiary synchronization signal (TSS)) that may be time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two symbols of an SS block), and synchronization signals (e.g., PSS and SSS) may be transmitted in another subset of SS block time resources. Furthermore, in deployments that use mmW transmission frequencies, multiple SS blocks may be transmitted in different directions using beam sweeping in an SS burst, and SS bursts may be periodically transmitted according to an SS burst set. In cases where a base station 105 may transmit omni-directionally, an SS block may be periodically transmitted according to a configured periodicity. For example, a base station 105 may transmit multiple instances of an SS block, on different beams, during a periodic broadcast channel transmission time interval (BCH TTI). In other cases, a base station 105 may transmit multiple instances of an SS block on a same beam, or in an omni-directional manner, during a periodic BCH TTI.

A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). In some cases, the PBCH may carry a master information block (MIB) and one or more system information blocks (SIBs) for a given cell.

Because a base station 105 may not know the locations of devices attempting to synchronize with a cell of the base station 105, SS blocks may be successively transmitted in a beam-swept manner (e.g., across multiple symbol periods). A UE 115 may receive one or more of the SS blocks and determine a suitable downlink beam pair (e.g., based on a signal quality of the SS block being greater than a threshold). However, the beams over which the SS blocks are transmitted may be relatively coarse (e.g., broad). Accordingly, communications between the UE 115 and base station 105 may benefit from beam refinement, in which narrower uplink and downlink receive and transmit beams are selected. The width of a given beam (e.g., a narrow beam, a broad beam, etc.) may be modified by adjusting weighting of one or more of the elements in a transmitting or receiving antenna array. Such adjustments may be empirically determined by a receiving device (e.g., based on measurements of one or more reference signals). Each UE 115 attempting to access a given cell may receive a set of downlink reference signals and transmit a set of uplink reference signals to enable such beam refinement.

In some cases, a UE 115 receives an SS block may perform a cell measurement on the SS block and may also acquire a network associated with a base station 105 that transmitted the SS block. To determine a beam on which the SS block is transmitted, or to determine a timing of the SS block within a sequence of SS blocks (and in some cases, to fully determine the timing of the SS block or a synchronization signal therein), a UE 115 may have to decode a PBCH within the SS block and obtain an SS block index from the SS block (e.g., because the SS block index may convey a beam index associated with the SS block and/or the location of the SS block within a sequence of SS blocks).

In some cases, a UE 115 may monitor a communications link 125 continuously for an indication that the UE 115 may receive data. In other cases (e.g., to conserve power and extend battery life) a UE 115 may be configured with a DRX cycle. A DRX cycle consists of an "On Duration" when the UE 115 may monitor for control information (e.g., on PDCCH) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle.

In wireless communications system 100, devices may communicate over multiple portions of a system bandwidth at the same time. Such a configuration may improve throughput for the communications or otherwise benefit the system. However, because transmissions over the different bandwidth portions may have different paths (e.g., may be transmitted from different antennas, may experience different degrees of path loss, may be received over different antennas, etc.), a receiving device may have to process the transmissions independently (e.g., the receiving device may not be able to exploit signal processing of an antenna port on one sub-band to facilitate processing of a QCLed antenna port on another sub-band). In other cases, two or more antenna ports may be assumed to have a quasi co-location (QCL) relationship. That is, a UE 115 may be able to derive the properties of a first channel (e.g., delay spread, Doppler spread, frequency shift, average power, etc.) transmitted on a first antenna port from measurements made on a second channel transmitted on a second antenna port. Further, a base station 105 may signal an indication of a QCL relationship (e.g., a spatial relationship, etc.) between the two portions of bandwidth (e.g., which may be referred to as carriers or sub-bands herein) to allow a UE 115 to transmit (or receive) a second signal over a second portion of the bandwidth based on processing of a first signal received over the first portion of the bandwidth. In some cases, exploiting QCL relationships (or reciprocal QCL relationships) may reduce overhead for a wireless system.

Wireless communications system 100 may support C-DRX wake up procedure over mmW frequency band resources. Each of the base stations 105 and UEs 115 may use multiple antenna ports associated with antenna arrays to emit one or more transmit beams (e.g., BRSs for beam-formed (e.g., beam-swept) data transmission and reception). For example, a base station 105 may use beamforming techniques for downlink reference signal, PDCCH, and PDSCH transmission to one or more configured UEs 115. Similarly, the UEs 115 may implement beamforming techniques for receive beam training, downlink transmit beam selection, and uplink transmission.

Each of the one or more UEs 115 within wireless communications system 100 may be camped on a cell associated with a base station 105. The one or more UEs 115 may establish an RRC connection with the associated base station 105. During RRC connection establishment, one or more UEs 115 may implement a DRX configuration to enable efficient use of battery power for reception of downlink transmissions. The DRX configuration, including a DRX-On cycle and DRX-Off cycle duration, may be configured at the UE 115 via an RRC connection setup request of RRC connection reconfiguration request. The DRX configuration may determine how frequently the one or more UEs 115 are scheduled to wake up and receive downlink data in accordance with the configured DRX cycle durations.

Wireless communications system 100 may also support transmissions of beam-swept C-RNTIs to UEs 115 in a sleep state of a DRX mode. For example, a base station 105 may transmit a set of signals (e.g., DMRS, CSI-RS, SSS, PSS, SS blocks, etc.) using a beam sweeping configuration. The base station 105 may then transmit, using the same beam sweeping configuration, a control channel (e.g., PDCCH) that indicates at least a part of a C-RNTI for a UE 115 that is scheduled to receive downlink data (where CRC bits of the control channel may be scrambled by the C-RNTI). In such cases, the beams used for the transmission of the C-RNTI and the beams used for transmitting the set of signals may be QCLed. The UE 115 may wake up early from a sleep state of the DRX mode (e.g., prior to a scheduled active state) and receive the beam-swept set of signals. Additionally, the UE 115 may perform beam training for a set of receive beams, and further identify a beam on which to monitor for the C-RNTI, for example, based on a signal strength of the received set of signals. Because the beams used for the beam-swept C-RNTI may be QCLed with the beams used for the preceding signal transmission, the UE 115 may efficiently identify the strongest beam on which to receive the C-RNTI. As a result, the UE 115 may save power that may have otherwise been used for decoding respective PDCCH transmissions sent on multiple beams, thereby reducing energy consumption at the UE 115 and enhancing DRX procedures for receiving data while in a sleep state.

FIGS. 2A, 2B, 2C, and 2D illustrate an example of a wireless communications system 200-a, 200-b, 200-c, and 200-d, respectively, in accordance with various aspects of the present disclosure. In some examples, wireless communications system 200-a through 200-d may implement aspects and features of wireless communications system 100. For example, wireless communications system 200-a through 200-d includes base station 105-a and UE 115-a. Base station 105-a may be an example of a base station 105 described with reference to FIG. 1 and may perform beam-swept downlink reference signal and control information transmission. UE 115-a may be an example of UE 115 described with reference to FIG. 1, and may perform receive beam refinement, transmit beam selection, and transmit uplink responses to received downlink beam-swept transmission. UE 115-a may implement a DRX configuration in accordance with a RRC connection establishment, and perform scheduled DRX-On cycle durations for monitoring PDCCH subframes over system resources.

Base station 105-a may implement procedures to convey one or more reference signal indications and at least a portion of a C-RNTI to UE 115-a. Base station 105-a may transmit the one or more reference signals to UE 115-a as a preemptive indication for a subsequent beam-swept C-RNTI transmission. In such cases, base station 105-a may transmit the reference signals via multiple transmit beams 205 (e.g., including BRSs contained within one or more beam sweep transmissions). The reference signals may provide a reference point for downlink power over channel resources. Additionally, the reference signals may be specific to UE 115-a or specific to a cell camped on by UE 115-a (e.g., geographic coverage area 110-a).

In some cases, each of the reference signals may contain one or more SS bursts (or SS blocks), channel state information reference signal (CSI-RS) bursts, or both. Each of the bursts may have a configurable periodicity (e.g., 5, 10, 20, 40, 80, 160 ms). The SS bursts may be independent of the channel bandwidth and contain one or more PSS symbols, SSS symbols, and PBCH symbols. For example, a single SS burst may contain one PSS symbol, one SSS symbol, and two PBCH symbols including demodulation reference signal (DMRS) sequences.

In other cases, each of the reference signals may include one or more SS bursts with a subsequent beam-swept paging transmission (e.g., the SS burst(s) may be followed by the paging transmission), which may be distinct from a CSI-RS transmission and QCLed with the antenna resources of the one or more SS bursts. A QCL relationship between one or more beam transmissions may refer to a spatial relationship between the antenna ports (and the corresponding signaling beams) of the respective transmissions. For example, one or more antenna ports may be implemented by base station 105-a for transmitting at least one or more reference signals and command information transmissions (e.g., C-RNTI) to UE 115-a. However, the channel properties of the signals sent via the different antenna ports may be interpreted (e.g., by a receiving device) to be the same (e.g., despite the signals being transmitting from different antenna ports), and the antenna ports (and the respective beams) may be determined to be QCLed. In such cases, UE 115-a may have respective antenna ports to emit receive beams used for receiving the QCLed transmissions (e.g., the reference signal and C-RNTI). The SS bursts may contain one or more PSS, SSS, and PBCH symbols, and the PBCH symbol may contain DMRS sequences. Base station 105-*a* may configure the paging transmission such that the transmission is multiplexed with one or more SS bursts or may schedule the paging transmission as a subsequent indication following an SS burst transmission. In some cases, base station 105-*a* may provide an indication of the paging information via DCI or a non-scheduled physical channel. For example, base station 105-*a* may transmit a single SS burst containing each of a single SSS symbol, PSS symbol, and two PBCH symbols containing DMRS sequences. Base station 105-*a* may provide subsequent reference signaling to UE 115-*a* via paging indication via beam-swept transmission. The paging signaling may be QCLed with the set of transmit beams corresponding to the preceding SS burst.

UE 115-*a* may initiate a wake up procedure prior to a configured DRX-On cycle and emit a receive beam sweep. The receive beam sweep may contain one or more angularly offset receive beams 210, according to an orientation of UE 115-*a*. As an illustrative example, UE 115-*a* may sweep receive beams 210 in four different directions. However, it is understood that the receive beams 210 may be swept through any number of directions, orientations, angles, vertical offsets (e.g., from a plane), and the like. In some cases, a subset of the one or more receive beams 210 may be emitted in a general direction of the downlink transmit beams 205 and considered aligned with the downlink reference signal transmission. UE 115-*a* may receive the one or more transmit beams 205 (e.g., beam-swept reference signal transmissions) via one or more aligned receive beams 210. UE 115-*a* may assume the periodicity of the at least one SS bursts of the downlink transmission according to at least a connection state (e.g., RRC-Connected, RRC-Idle, initial access, etc.) or a network configuration of the connection establishment. Based on the network configuration, UE 115-*a* may determine a supported measurement window (e.g., 1, 5, 10 ms) and supported measurement periodicity (5, 10, 20, 40, 80, 160 ms) of the one or more SS bursts. In some cases, if UE 115-*a* is in an initial access state, UE 115-*a* may determine an SS burst periodicity of 20 ms. In other cases, UE 115-*a* is in an idle or connected state, UE 115-*a* may evaluate the network configuration for a configured measurement periodicity indication. In the case that an indication is provided, UE 115-*a* may assume the SS burst periodicity of the indication. In the case that an indication is not provided, UE 115-*a* may assume an SS burst periodicity (e.g., 5 ms).

In the case of one or more CSI-RS burst indications, UE 115-*a* may determine a configurable periodicity (e.g., 5, 10, 20, 40, 80, 160 ms) of each of the at least one CSI-RS bursts according to a NR supported radio resource management (RRM) measurement for protocol layer mobility (e.g., L3 mobility). The L3 mobility may also include one or more indications corresponding to at least a configurable transmission bandwidth, a measurement bandwidth, a numerology, a time and frequency resource mapping, and parameters for sequence generation. UE 115-*a* may then interpret the included indications.

Figure 2A:
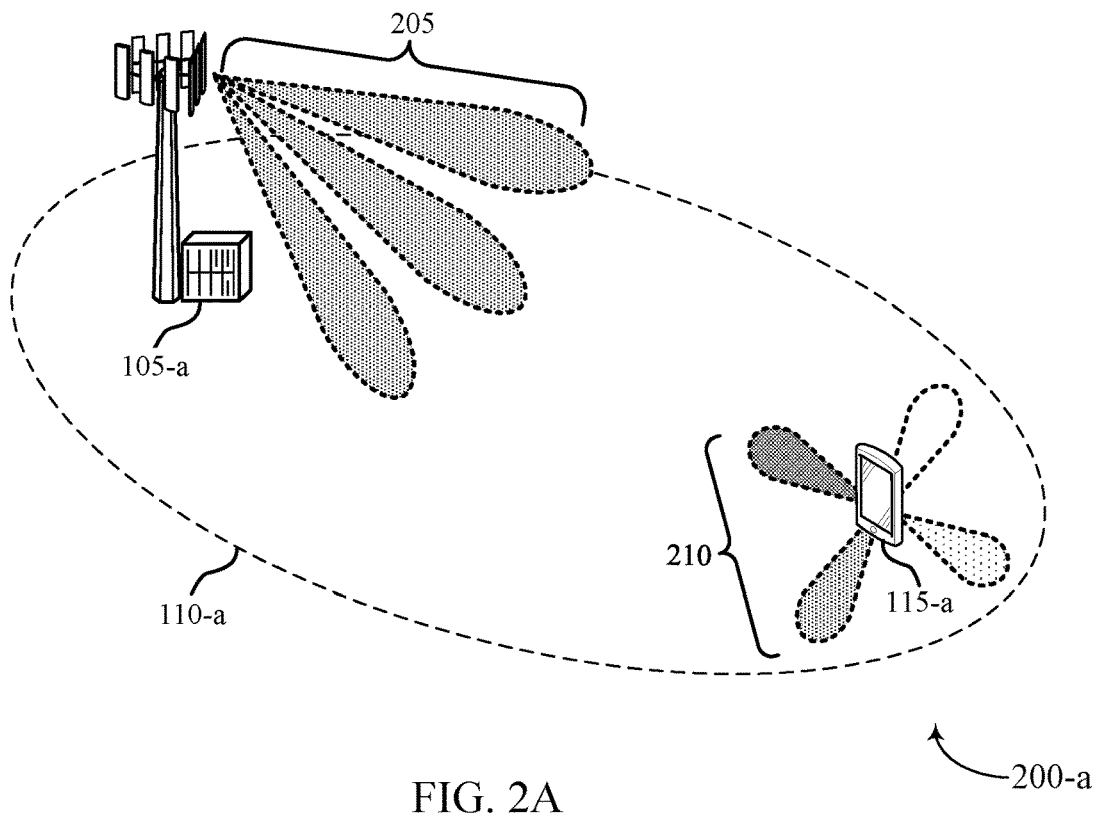
FIGS. 2A through 2D illustrate an example of a wireless communications system in accordance with aspects of the present disclosure.
Figure 2B:
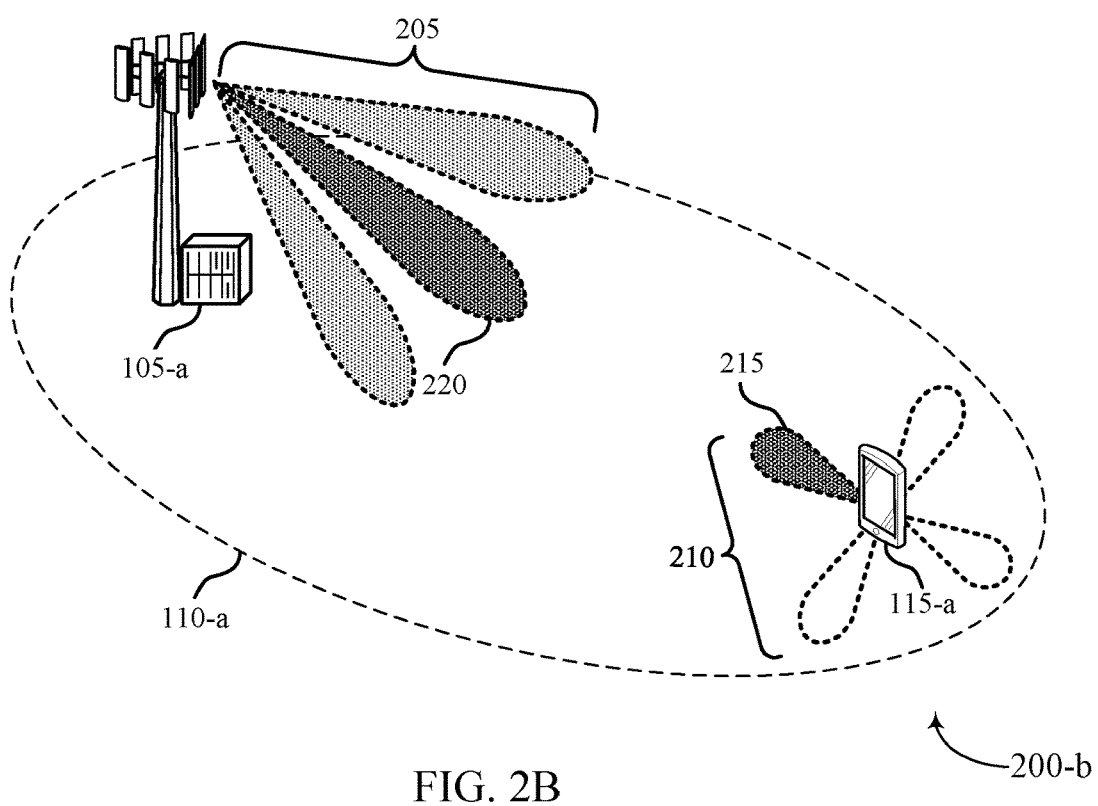

As illustrated in FIG. 2B, UE 115-*a* may decode (e.g., upon reception of one or more of the transmit beams 205) the one or more reference signal transmissions contained within the transmit beams 205 and train the set of receive beams 210 emitted by UE 115-*a* for a subsequent C-RNTI transmission. In the case of an SS burst containing a single SSS symbol, a single PSS symbol, and two DMRS included PBCH symbols, UE 115-*a* may train three receive beams 210 for subsequent C-RNTI reception. UE 115-*a* may determine a receive direction 215 (e.g., corresponding to a receive beam 210) to decode subsequent downlink transmissions based on the training of the receive beams 210. Additionally, UE 115-*a* may determine a preferred transmit beam 220 of the downlink reference signal transmission in accordance with the determined receive direction 215. Put succinctly, based on the reception of the one or more reference signal transmissions, UE 115-*a* may determine a preferred downlink transmit beam 220 associated with receive direction 215, where subsequent C-RNTI transmission of base station 105-*a* may be QCLed with (or transmitted on) the preferred transmit beam 220 and received and evaluated by UE 115-*a*. By evaluating the C-RNTI on a single transmit beam (e.g., preferred transmit beam 220), UE 115-*a* may obviate extensive wake up procedures involving repeated PDCCH decoding attempts over multiple transmit beams 205 of the received downlink beam sweep.

Figure 2C:
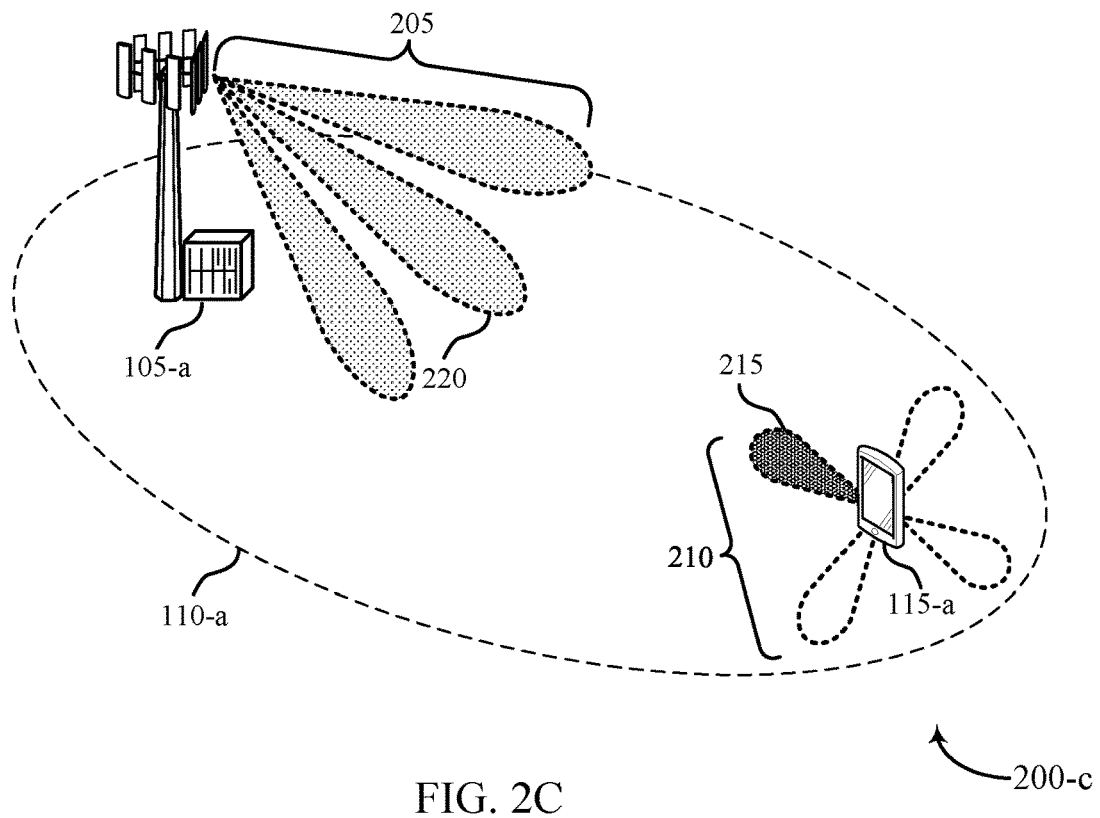

As illustrated in FIG. 2C, base station 105-*a* may transmit at least a portion of the C-RNTI value associated with UE 115-*a* via multiple antenna ports. As described above, the antenna ports may be spatially QCLed with the associated antenna ports of the preemptive reference signal transmissions, which may include the preferred downlink transmit beam 220. Base station 105-*a* may transmit the C-RNTI transmission via transmit beams 205 (e.g., BRSs) oriented according to a beam sweep transmission over PDCCH (or PDSCH) resources. Each transmit beam 205 of the downlink transmission may include a single bit on/off signal indicating whether there is downlink data scheduled for UE 115-*a*. In some cases, base station 105-*a* may use the C-RNTI value to scramble the control or data channel transmission (e.g., PDCCH, PDSCH). Additionally or alternatively, base station 105-*a* may include the C-RNTI value in a payload of the control or data channel transmission.

UE 115-*a* may receive the beamformed C-RNTI transmission of base station 105-*a* over PDCCH or PDSCH resources. According to the determined receive direction 215 associated with receive beams 210, UE 115-*a* may detect the C-RNTI transmission on the single downlink transmit beam 220 and attempt to decode the received C-RNTI information, including the received on/off bit signal. In the case that the C-RNTI value is not associated with UE 115-*a*, UE 115-*a* may suspend decoding operations and re-initiate a sleep mode operation of the DRX configuration. In the alternate case where the C-RNTI value is associated with UE 115-*a*, UE 115-*a* may evaluate the on/off bit signal to determine whether to receive a scheduled downlink data transmission and/or to finish decoding the C-RNTI transmission.

Figure 2D:
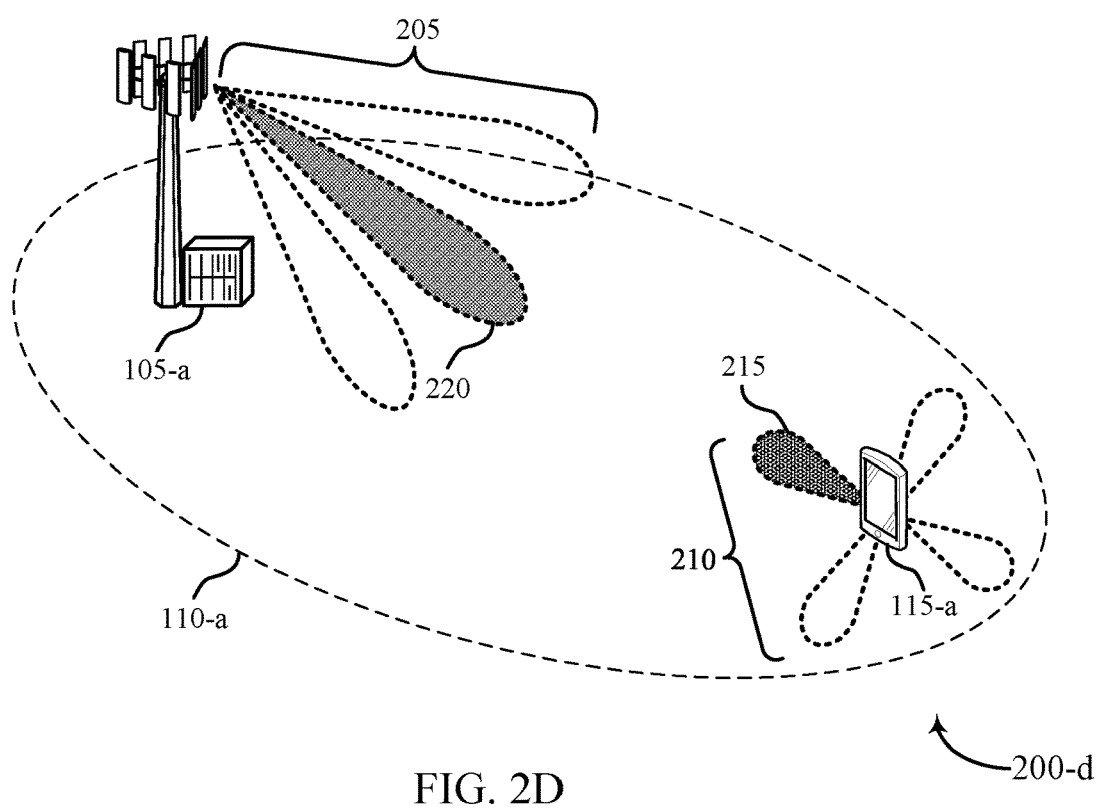

As illustrated in FIG. 2D, UE 115-*a* may transmit an uplink response signal (e.g., a recovery or beam recovery signal) to base station 105-*a* indicating preference for the determined transmit beam 220. The indication may reduce latency and path interference for subsequent data reception at UE 115-*a*, allowing for direct data reception over mmW resources. UE 115-*a* may spatially orient the uplink response signal according to the determined receive direction 215 associated with beams 210 (e.g., UE 115-*a* may transmit the uplink response signal in the same direction as receive direction 215). Base station 105-*a* may receive the uplink response signal (e.g., including a beam recovery signal) and identify transmit beam 220 of the one or more C-RNTI transmit beams. In some cases, base station 105-*a* may receive the beam recovery signal within a symbol period of the received uplink response signal. In some cases, a beam recovery signal may be referred to as a beam recovery request. Based on the symbol period used for the received beam recovery signal, base station 105-*a* may identify transmit beam 220 for downlink data transmission. Base station 105-*a* may compile the downlink data designated for UE 115-*a* and, during a DRX-On cycle of UE 115-*a*, directly transmit the downlink data via transmit beam 220 over PDSCH resources. UE 115-*a* may then receive and interpret the downlink data synchronously to the scheduled DRX-On cycle duration, allowing UE 115-*a* to perform a single interpretation of the downlink data information over the single transmit beam 220.

Figure 3:
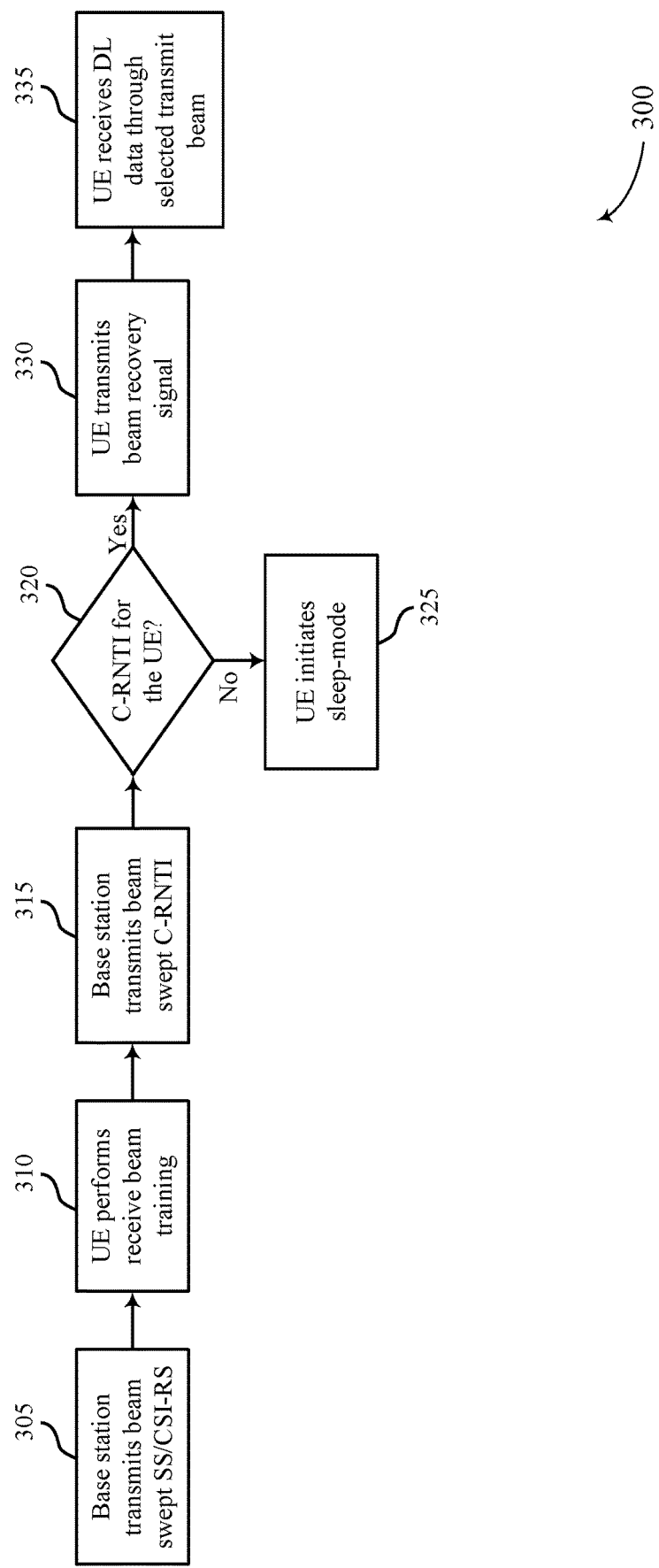
FIGS. 3 and 4 illustrate examples of process flows in a system in accordance with aspects of the present disclosure.

FIG. 3 illustrates an example of a process flow 300 in accordance with various aspects of the present disclosure. In some cases, process flow 300 may represent aspects of techniques performed by one or more base stations 105 for downlink transmission, and one or more UEs 115 for receive beam refinement and beam selection, as described with reference to FIGS. 1, 2, and 3. Process flow 300 illustrates techniques for beamformed C-RNTI transmission and reception for efficient DRX procedures at a UE 115.

At 305, a base station 105 may transmit one or more reference signals to a UE 115 synchronized with the base station 105 according to an established RRC connection. The base station 105 may transmit the reference signals via BRSs of one or more beam-swept transmissions. The beam-swept transmissions may function as a reference point for downlink power over channel resources and a preemptive indication for subsequent beam-swept C-RNTI transmission. The reference signals may be specific to the UE 115, or specific to a network cell camped on by the UE 115 (e.g., a serving cell provided by the base station 105, etc.). In some cases, the reference signals may include one or more SS bursts, CSI-RS bursts, or both. In other cases, the reference signals may include one or more SS bursts and a beam-swept paging transmission distinct from CSI-RS transmission. The paging transmission may be QCLed with the antenna ports of the one or more SS bursts and multiplexed with the SS bursts.

At 310, the UE 115 may initiate a wake up procedure prior to a configured DRX-On cycle and receive the one or more beam-swept reference signal transmissions of the base station 105. For example, the UE 115 may wake up a predetermined amount of time before the DRX-On cycle to receive the beam-swept reference signals. In such cases, the UE 115 may assume a periodicity of each the at least one SS bursts according to a connection state of the UE 115, a network configuration of the connection establishment, or both. In the case of one or more CSI-RS bursts, the UE 115 may determine a configurable periodicity according to a NR supported RRM measurement for protocol layer mobility (e.g., L3 mobility). The UE 115 may interpret the included indications, decode the one or more reference signal transmissions, and train a set of receive beams for subsequent C-RNTI reception. As part of the receive beam training, the UE 115 may determine a preferred transmit beam of the base station 105, where the C-RNTI transmission may be QCLed with (or transmitted on) a preferred transmit beam.

At 315, the base station 105 may transmit at least a portion of the C-RNTI associated with the UE 115 via multiple antenna ports QCLed with the associated antenna ports of the preemptive reference signal transmissions. The base station 105 may transmit the C-RNTI via BRSs oriented according to a beam sweep transmission over PDCCH or PDSCH resources. In some cases, the base station 105 may use the C-RNTI value to scramble control or data channel transmission (e.g., PDCCH, PDSCH). For instance, the CRC of a PDCCH or PDSCH may be scrambled by the C-RNTI value. In some cases, the resulting CRC may be considered to be an indication of at least a portion of the C-RNTI. Additionally or alternatively, the base station 105 may include the C-RNTI value in a payload of the channel transmission. The transmission may include a beamformed transmission of a single on/off bit signal indicated whether downlink data is scheduled for the UE 115.

At 320, the UE 115 may receive the beam-swept C-RNTI transmission over PDCCH or PDSCH resources on the preferred transmit beam. The UE 115 may attempt to decode the received downlink transmission, including the received on/off bit signal, according to the C-RNTI value of the UE 115. In some examples, the UE 115 may determine that the C-RNTI value transmission from the base station 105 is not associated with the UE 115. The UE 115 may then suspend decoding operations and initiate (or re-initiate) a sleep mode operation of the DRX configuration at 325. Alternatively, at 330, the UE 115 may determine the C-RNTI transmission is associated with the UE 115. For instance, the C-RNTI may be associated with the UE 115 by being an individual C-RNTI (e.g., in the case of a full C-RNTI being indicated by the transmission) or a group C-RNTI (e.g., in the case of a portion of a C-RNTI being indicated by the transmission). The UE 115 may then evaluate the on/off bit signal to determine if subsequent downlink data corresponding to the UE 115 exists, and finish decoding the C-RNTI transmission. Upon determining there exists downlink data, the UE 115 may transmit an uplink response signal (e.g., a recover signal) to the base station 105 indicating preference for the determined downlink transmit beam.

At 335, the base station 105 may receive the uplink response and identify the transmit beam of the downlink beam sweep as indicated in the response. The base station 105 may compile the downlink data designated for the UE 115 and, during a DRX-On cycle of the UE 115, directly transmit the downlink data via the preferred transmit beam indicated by the UE 115. The UE 115 may then receive and interpret the downlink data synchronously to the scheduled DRX-On cycle duration, which may allow the UE 115 to perform a single interpretation of the downlink data information over a single transmit beam.

Figure 4:
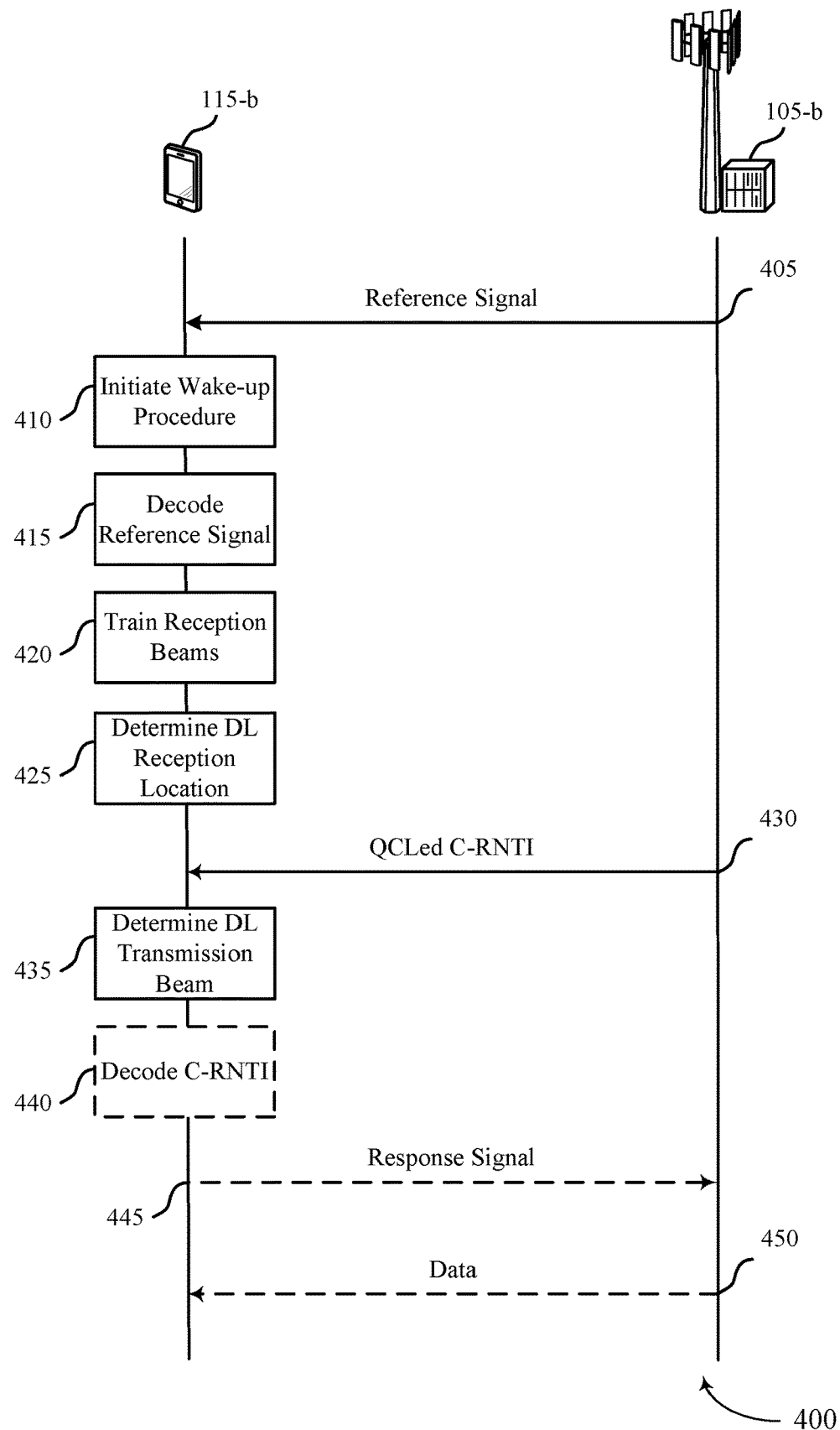

FIG. 4 illustrates an example of a process flow 400 in accordance with various aspects of the present disclosure. In some cases, process flow 400 may represent aspects of techniques performed by one or more base stations 105 for downlink transmission, and one or more UEs 115 for beam selection for efficient DRX procedure, as described with reference to FIGS. 1, 2, and 3. Within process flow 400, UE 115-*b* and base station 105-*b* may implement beamforming techniques for reference signal and channel information transmission and reception. UE 115-*b* and base station 105-*b* may be synchronized according to an established RRC connection.

At 405, base station 105-*b* may transmit one or more reference signals to UE 115-*b* via BRSs of one or more beam-swept transmissions. The beam-swept transmissions may function as at least a reference point for downlink power over channel resources and a preemptive indication for subsequent beam-swept C-RNTI transmission. The reference signals may be specific to UE 115-*b*, or specific to a network cell camped on by UE 115-*b*. In some cases, the reference signals may contain one or more SS bursts, CSI-RS bursts, or both. In other cases, the reference signals may contain one or more SS bursts and beam-swept paging transmission distinct from CSI-RS transmission. The paging transmission may be QCLed with the antenna resources of the one or more SS bursts and multiplexed with the SS bursts.

At 410, UE 115-*b* may initiate a wake up procedure prior to a configured DRX-On cycle (e.g., prior to an active state) to receive one or more beam-swept reference signal transmissions from base station 105-*b*. Based on a network configuration of the connection establishment and a connection state of UE 115-*b* (e.g., RRC-Connected, RRC-Idle, initial access, etc.), UE 115-*b* may determine a supported measurement window (e.g., 1, 5, 10 ms) and supported measurement periodicity (e.g., 5, 10, 20, 40, 80, 160 ms) of the one or more SS bursts. In the case of one or more CSI-RS burst indications, UE 115-*b* may determine a configurable periodicity (e.g., 5, 10, 20, 40, 80) of each of the at least one CSI-RS bursts according to a NR supported radio RRM measurement for protocol layer mobility (e.g., L3 mobility).

At 415, UE 115-*b* may receive the one or more beam-swept reference signal transmissions from base station 105-*b*. UE 115-*b* may interpret one or more included indications of the one or more reference signal transmissions and then decode the reference signals. At 420, UE 115-*b* may train a set of receive beams for subsequent C-RNTI reception. At 425, UE 115-*b* may determine a preferred transmit beam of base station 105-*b*, where the C-RNTI transmission may be QCLed with (or transmitted on) a preferred transmit beam.

At 430, base station 105-*b* may transmit at least a portion of the C-RNTI value associated with UE 115-*b* via multiple antenna ports. The antenna ports may be spatially QCLed with the antenna ports of the reference signal transmission 405. Base station 105-*b* may transmit the C-RNTI via BRSs oriented according to a beam sweep transmission over PDCCH or PDSCH resources. In some cases, base station 105-*b* may use the C-RNTI value to scramble the channel transmission (e.g., PDCCH, PDSCH). For instance, CRC bits of the channel transmission may be scrambled by the C-RNTI value. Additionally or alternatively, base station 105-*b* may include the C-RNTI value in a payload of the channel transmission. The transmission may include a beamformed transmission of a single on/off bit signal indicated whether downlink data is scheduled for UE 115-*b*.

At 435, UE 115-*b* may receive the beamformed C-RNTI transmission over PDCCH or PDSCH resources. UE 115-*b* may determine a single transmit beam of the C-RNTI transmission spatially proximal to the preferred transmit beam and evaluate downlink information on the transmit beam. In some cases, the evaluation may include determining whether the C-RNTI value is included in the payload of the channel transmission.

At 440, UE 115-*b* may decode or detect the C-RNTI value on the transmit beam and attempt to decode the received C-RNTI value. In the case that the C-RNTI value is associated with UE 115-*b*, UE 115-*b* may evaluate the on/off bit signal on the single transmit beam and determine if there exists scheduled downlink data.

At 445, UE 115-*b* may transmit an uplink response signal (e.g., recovery signal) to base station 105-*b*. The response signal may indicate preference for the determined transmit beam and request subsequent downlink data transmission over the determined transmit beam. Base station 105-*b* may receive the uplink response signal and identify the transmit beam of the downlink beam sweep as indicated in the response.

At 450, base station 105-*b* may compile the downlink data designated for UE 115-*b* and, during a DRX-On cycle of UE 115-*b*, directly transmit the downlink data via the identified transmit beam over PDSCH resources. UE 115-*b* may receive and interpret the downlink data synchronously to the scheduled DRX-On cycle duration.

Figure 5:
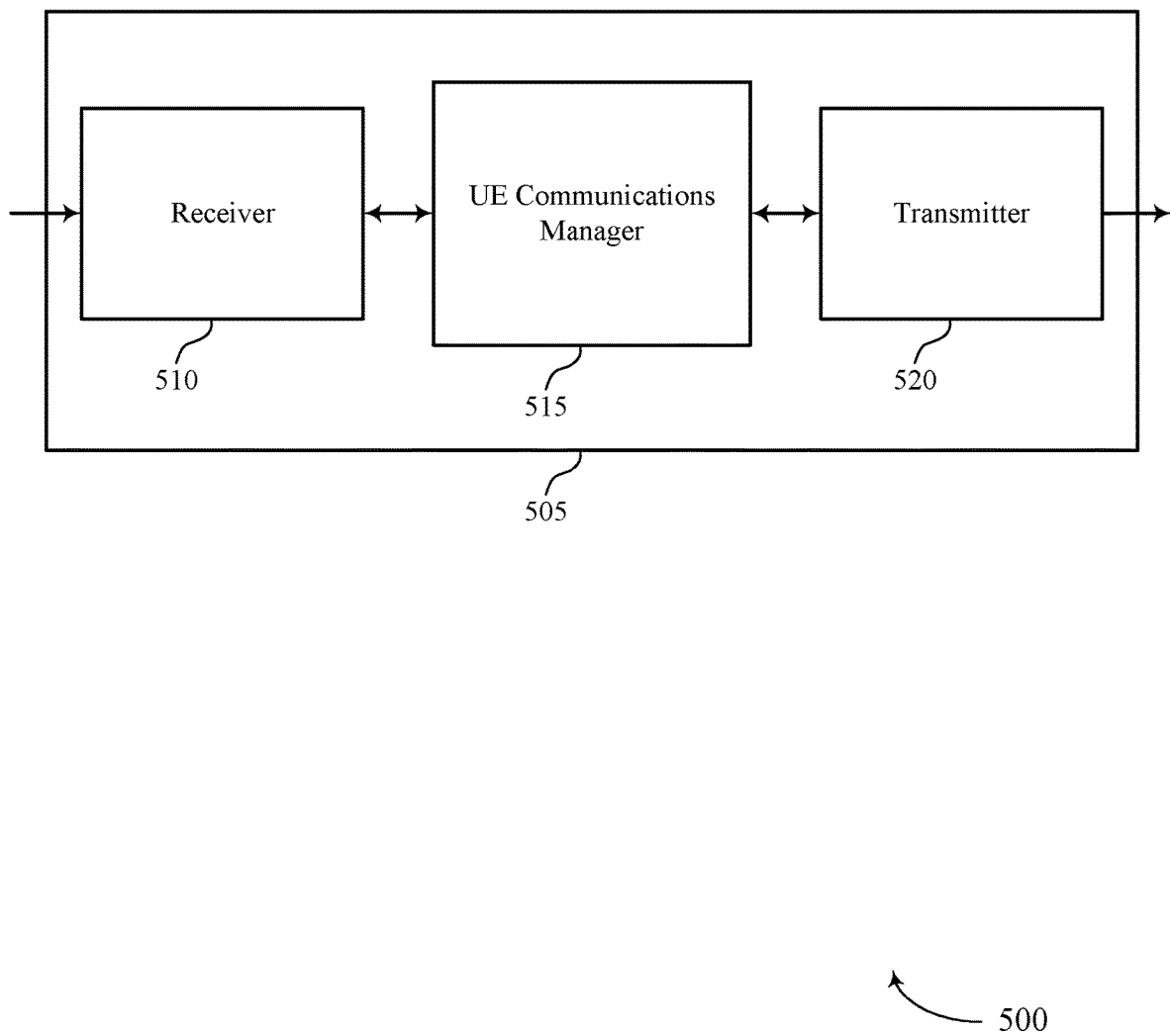
FIGS. 5 through 7 show block diagrams of a device in accordance with aspects of the present disclosure.

FIG. 5 shows a block diagram 500 of a wireless device 505 in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to discontinuous reception wake up procedures, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive, while operating in a DRX mode, a control channel that indicates at least a portion of a C-RNTI of a UE 115, the control channel transmitted by a base station 105 using a beam sweeping configuration. In some cases, UE communications manager 515 may select, by the UE 115, a downlink transmit beam of the base station 105 based on the received control channel and transmit an indication of the selected downlink transmit beam to the base station 105.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
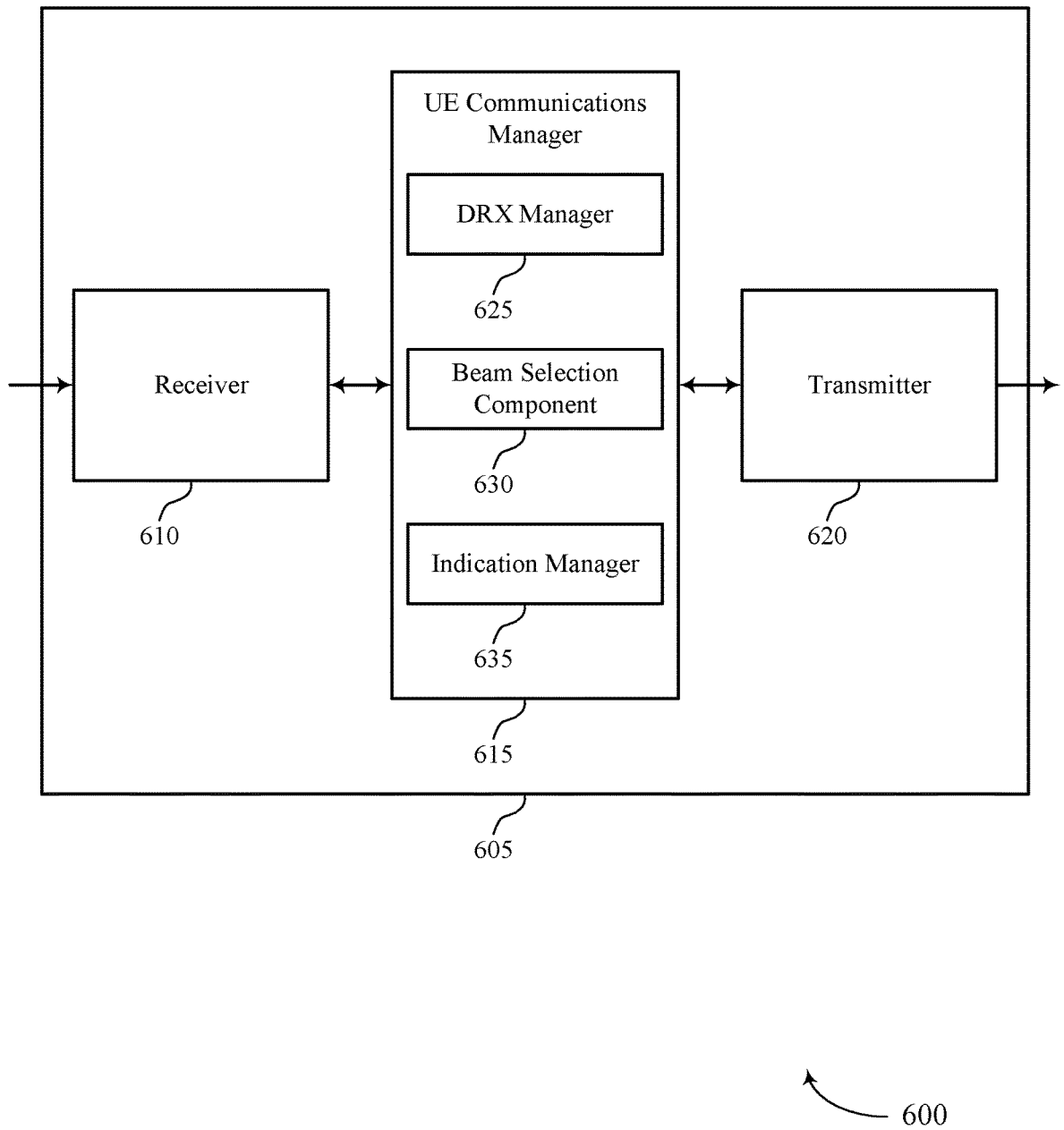

FIG. 6 shows a block diagram 600 of a wireless device 605 in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to discontinuous reception wake up procedures, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include DRX manager 625, beam selection component 630, and indication manager 635.

DRX manager 625 may wake from a sleep state prior to a scheduled active state of the DRX mode, where a set of signals are received from a base station 105 upon waking from the sleep state. Additionally, DRX manager 625 may receive, while operating in a DRX mode, a control channel that indicates at least a portion of a C-RNTI of the UE 115, the control channel transmitted by the base station 105 using a beam sweeping configuration. In some cases, DRX manager 625 may receive, as part of the control channel, a bit that indicates a presence of downlink data for the UE 115. In some cases, receiving the control channel includes receiving a PDCCH including at least a portion of the C-RNTI, where the PDCCH may be transmitted using the beam sweeping configuration.

Beam selection component 630 may select, by the UE 115, a downlink transmit beam of the base station 105 based on the received control channel and identify a receive beam for the UE 115 to use to receive the control channel based on the received set of signals from the base station 105. Indication manager 635 may transmit an indication of the selected downlink transmit beam to the base station 105. In some cases, the indication of the downlink transmit beam includes a beam recovery signal.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
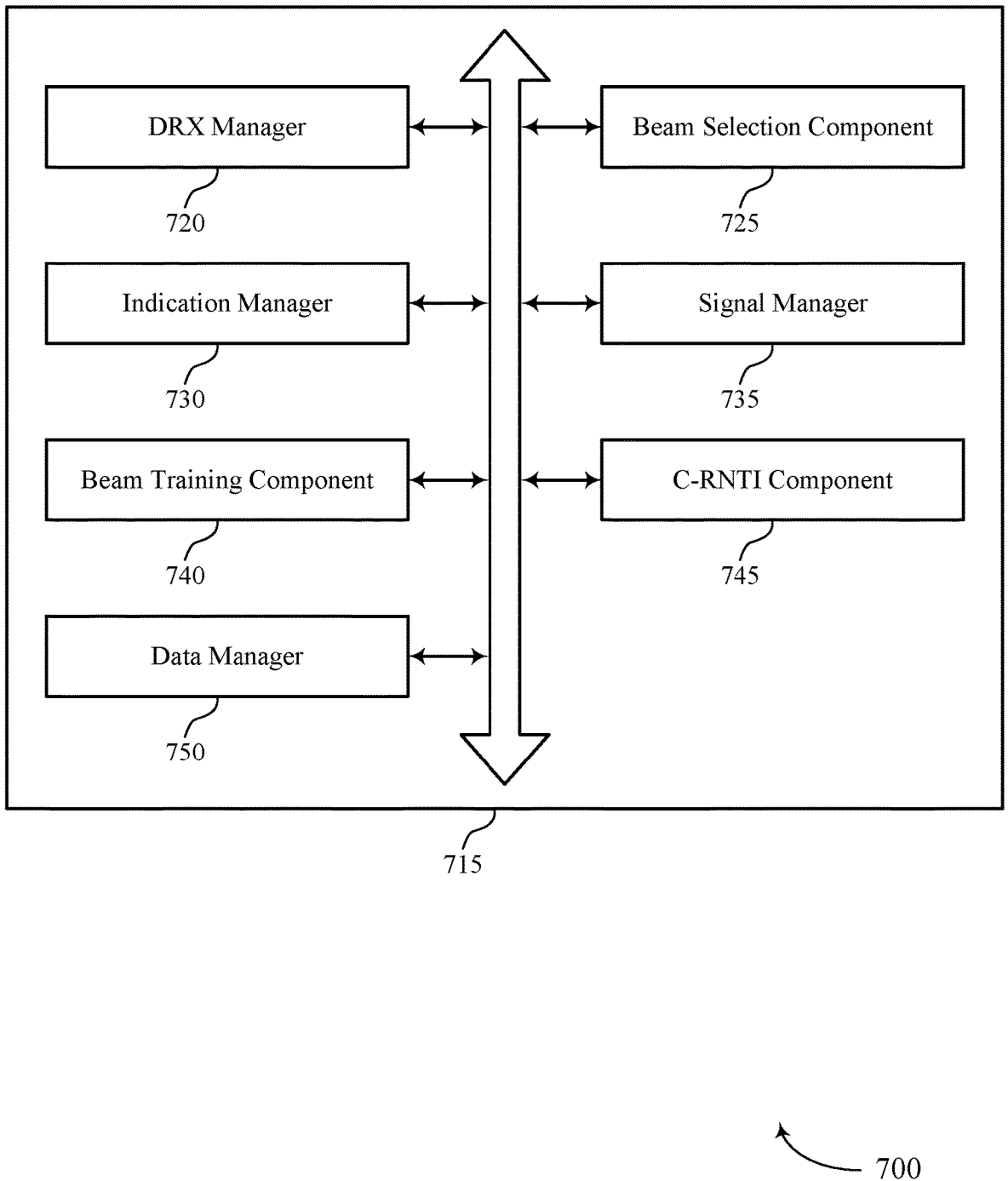

FIG. 7 shows a block diagram 700 of a UE communications manager 715 in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include DRX manager 720, beam selection component 725, indication manager 730, signal manager 735, beam training component 740, C-RNTI component 745, and data manager 750. Each of these modules may communicate, directly or indirectly, with one another (e.g., via one or more buses).

DRX manager 720 may wake from a sleep state prior to a scheduled active state of the DRX mode, where a set of signals are received from a base station 105 upon waking from the sleep state. Additionally, DRX manager 720 may receive, while operating in a DRX mode, a control channel that indicates at least a portion of a C-RNTI of the UE 115, the control channel transmitted by the base station 105 using a beam sweeping configuration. In some cases, DRX manager 720 may receive, as part of the control channel, a bit that indicates a presence of downlink data for the UE 115. In some cases, receiving the control channel includes receiving a PDCCH including at least a portion of the C-RNTI, where the PDCCH may be transmitted using the beam sweeping configuration.

Beam selection component 725 may select, by the UE 115, a downlink transmit beam of the base station 105 based on the received control channel and identify a receive beam for the UE 115 to use to receive the control channel based on the received set of signals from the base station 105. Indication manager 730 may transmit an indication of the selected downlink transmit beam to the base station 105. In some cases, the indication of the downlink transmit beam includes a beam recovery signal.

Signal manager 735 may receive a set of signals from the base station 105 while operating in the DRX mode, the set of signals including one or more reference signals, or one or more synchronization signals, or a combination thereof, where receiving the control channel is based on receiving the set of signals. In some examples, signal manager 735 may receive an indication of a cell-specific configuration for the set of signals, where the indication may be received via a MIB, or a MSIB, or RMSI, or a combination thereof. Additionally or alternatively, signal manager 735 may receive an indication of a UE-specific configuration for the set of signals, the indication received via a PDCCH, or a PDSCH, or a RRC message, or a combination thereof. In some cases, the one or more synchronization signals include a PSS, or an SSS, or a combination thereof. In some cases, the one or more reference signals include a DMRS, or a CSI-RS, or a combination thereof.

Beam training component 740 may train a set of receive beams while receiving the set of signals. In such cases, beam training component 740 may train the set of receive beams while receiving the set of signals over a set of symbol periods. C-RNTI component 745 may identify a C-RNTI of the UE 115 and decode the PDCCH using the C-RNTI. For example, C-RNTI component 745 may be an example of or include aspects of a decoder. In some examples, CRC bits of the PDCCH may be scrambled based on the C-RNTI. In some cases, C-RNTI component 745 may also identify the C-RNTI in a payload of the PDCCH. Data manager 750 may receive a PDSCH including at least a portion of the C-RNTI, the PDSCH transmitted using the beam sweeping configuration and receive, from the base station 105, downlink data over the downlink transmit beam.

Figure 8:
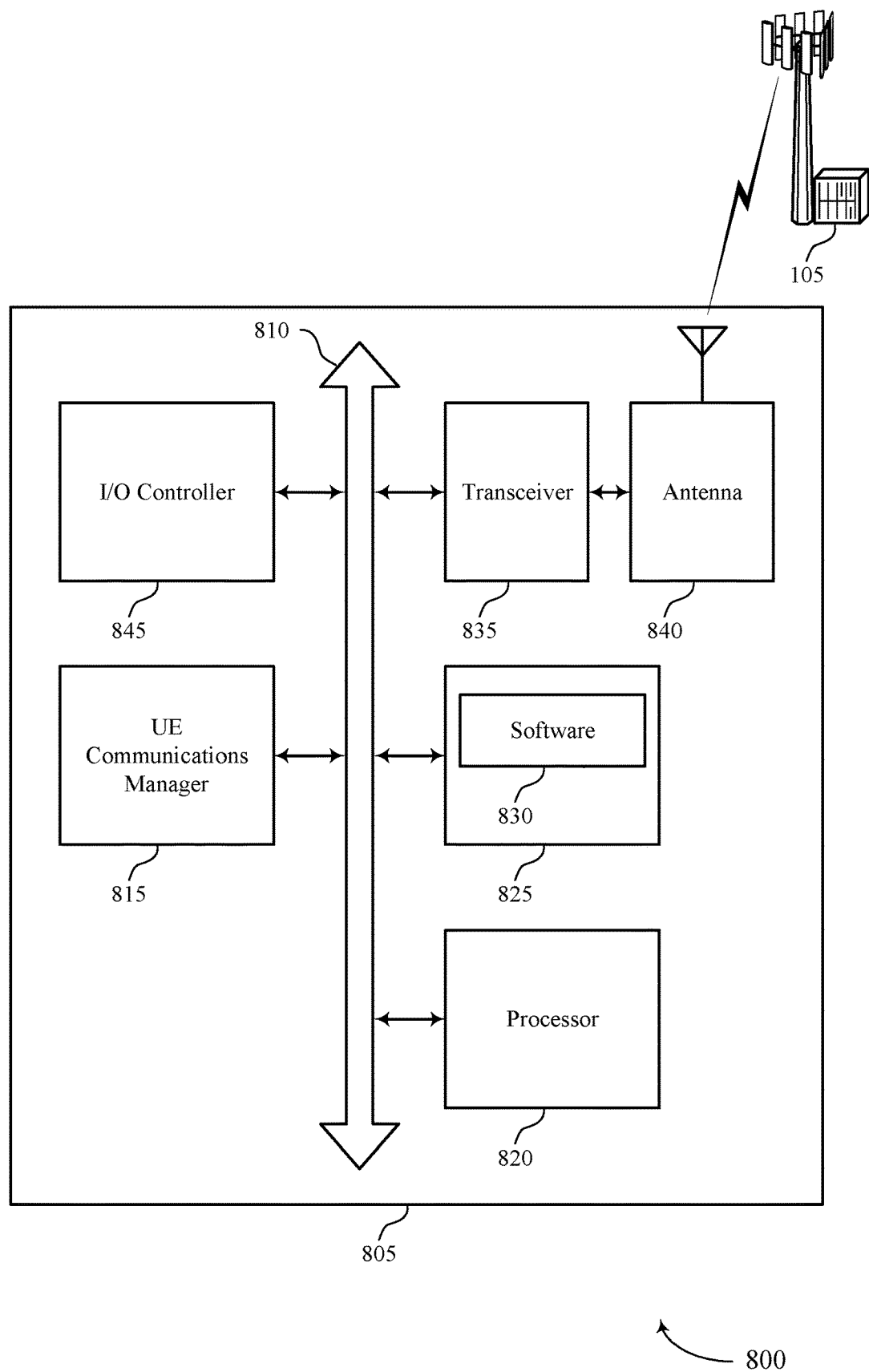
FIG. 8 illustrates a block diagram of a system including a user equipment (UE) in accordance with aspects of the present disclosure.

FIG. 8 shows a diagram of a system 800 including a device 805 in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting discontinuous reception wake up procedures).

Memory 825 may include random access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support discontinuous reception wake up procedures. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
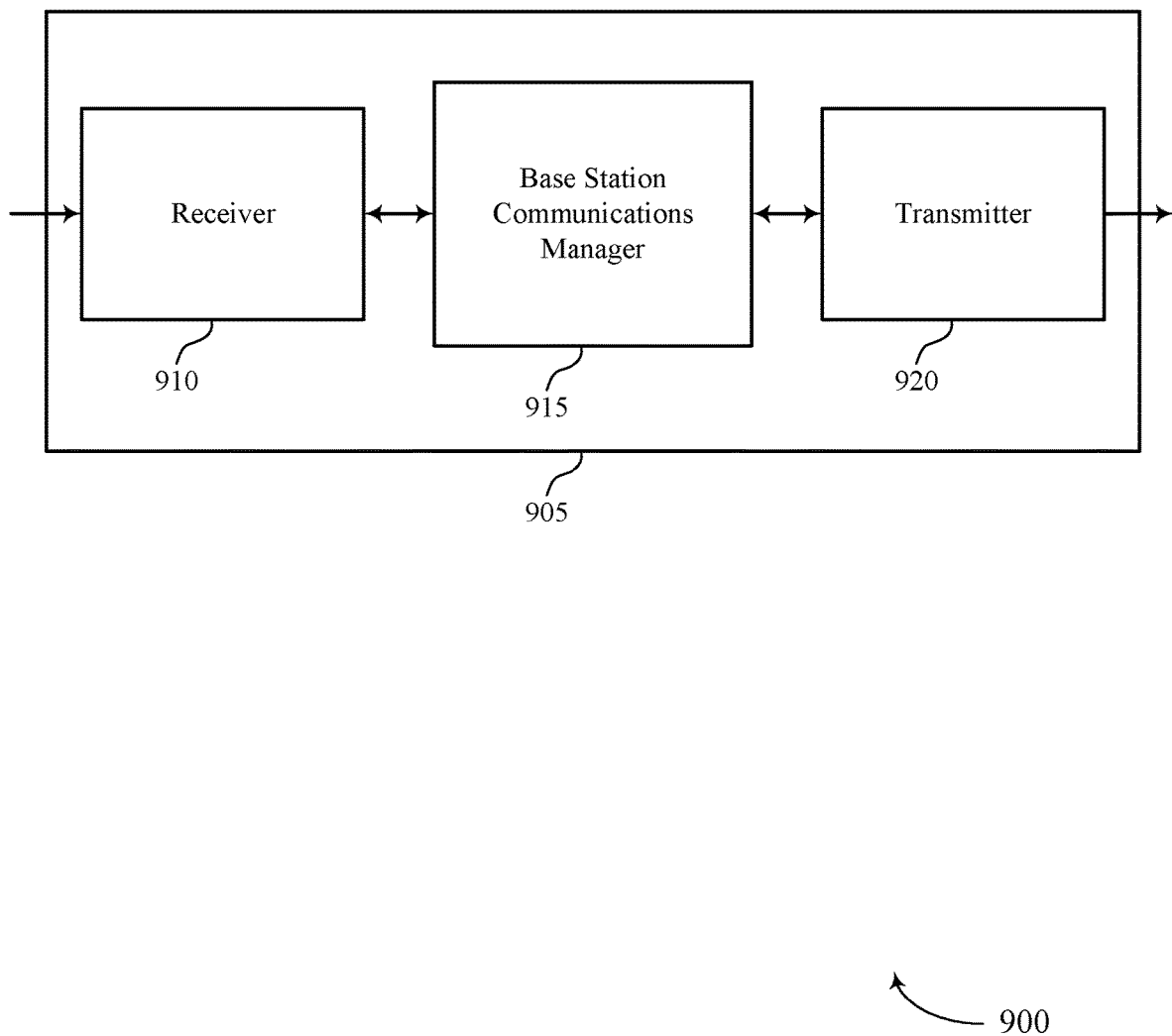
FIGS. 9 through 11 show block diagrams of a device in accordance with aspects of the present disclosure.

FIG. 9 shows a block diagram 900 of a wireless device 905 in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to discontinuous reception wake up procedures, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify that data is available to be transmitted to a UE 115 that is operating in a DRX mode, identify a C-RNTI of the UE 115, and transmit, to the UE 115, a control channel that indicates at least a portion of the identified C-RNTI using a beam sweeping configuration.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
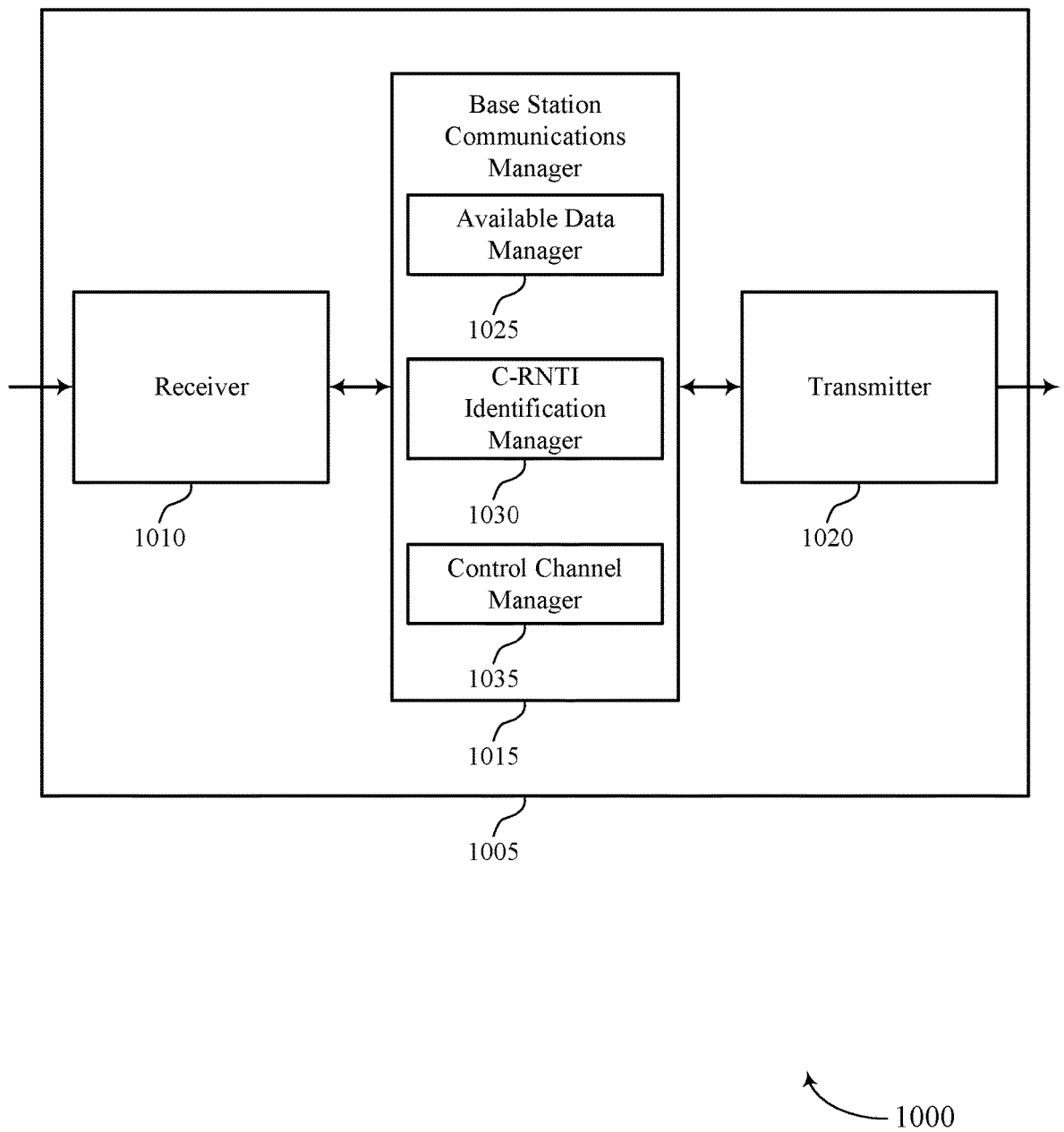

FIG. 10 shows a block diagram 1000 of a wireless device 1005 in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to discontinuous reception wake up procedures, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include available data manager 1025, C-RNTI identification manager 1030, and control channel manager 1035.

Available data manager 1025 may identify that data is available to be transmitted to a UE 115 that is operating in a DRX mode. C-RNTI identification manager 1030 may identify a C-RNTI of the UE 115. Control channel manager 1035 may transmit, to the UE 115, a control channel that indicates at least a portion of the identified C-RNTI using the beam sweeping configuration. In some examples, control channel manager 1035 may encode the PDCCH using the C-RNTI. For example, control channel manager 1035 may be or include aspects of an encoder. In some examples, control channel manager 1035 may include the C-RNTI in a payload of the PDCCH. Additionally or alternatively, control channel manager 1035 may transmit, as part of the control channel, a bit that indicates a presence of downlink data for the UE 115. In some cases, transmitting the control channel includes transmitting the control channel that indicates all of the identified C-RNTI to the UE 115 using the beam sweeping configuration. In some cases, transmitting the control channel includes transmitting the control channel using a first set of antenna ports that is spatially quasi co-located with a second set of antenna ports used for transmitting the set of signals. Additionally or alternatively, transmitting the control channel includes transmitting a PDCCH including at least a portion of the C-RNTI, the PDCCH transmitted using the beam sweeping configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
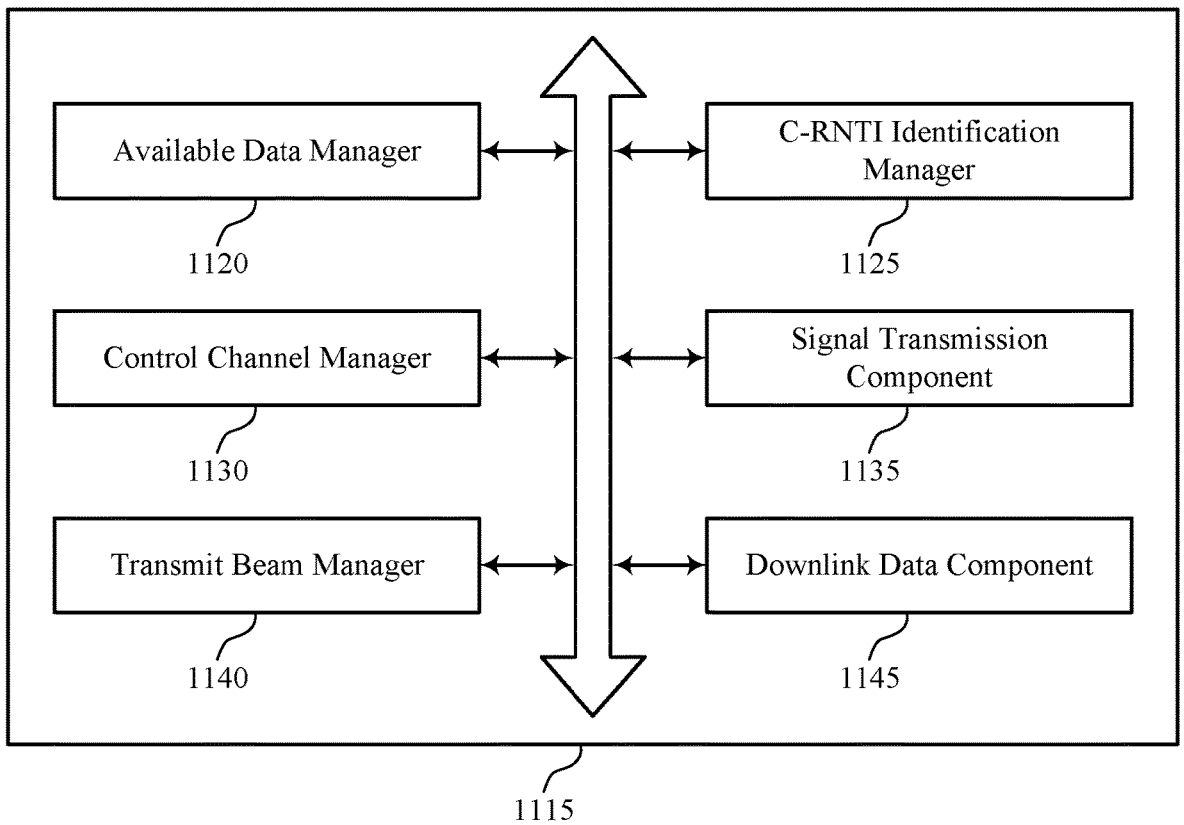

FIG. 11 shows a block diagram 1100 of a base station communications manager 1115 in accordance with aspects of the present disclosure. The base station communications manager 1115 may be an example of aspects of a base station communications manager 1215 described with reference to FIGS. 9, 10, and 12. The base station communications manager 1115 may include available data manager 1120, C-RNTI identification manager 1125, control channel manager 1130, signal transmission component 1135, transmit beam manager 1140, and downlink data component 1145. Each of these modules may communicate, directly or indirectly, with one another (e.g., via one or more buses).

Available data manager 1120 may identify that data is available to be transmitted to a UE 115 that is operating in a DRX mode. C-RNTI identification manager 1125 may identify a C-RNTI of the UE 115.

Control channel manager 1130 may transmit, to the UE 115, a control channel that indicates at least a portion of the identified C-RNTI using the beam sweeping configuration. In some examples, control channel manager 1130 may encode the PDCCH using the C-RNTI. For example, control channel manager 1130 may be or include aspects of an encoder. In some examples, control channel manager 1130 may include the C-RNTI in a payload of the PDCCH. Additionally or alternatively, control channel manager 1130 may transmit, as part of the control channel, a bit that indicates a presence of downlink data for the UE 115. In some cases, transmitting the control channel includes transmitting the control channel that indicates all of the identified C-RNTI to the UE 115 using the beam sweeping configuration. In some cases, transmitting the control channel includes transmitting the control channel using a first set of antenna ports that is spatially quasi co-located with a second set of antenna ports used for transmitting the set of signals. Additionally or alternatively, transmitting the control channel includes transmitting a PDCCH including at least a portion of the C-RNTI, the PDCCH transmitted using the beam sweeping configuration.

Signal transmission component 1135 may transmit, to the UE 115, a set of signals using the beam sweeping configuration, the set of signals including one or more reference signals, or one or more synchronization signals, or a combination thereof. In some cases, signal transmission component 1135 may configure the one or more reference signals as cell-specific reference signals, or UE-specific reference signals, or a combination thereof. In some examples, signal transmission component 1135 may transmit an indication of a cell-specific configuration for the set of signals, the indication transmitted using a MIB, or a MSIB, or RMSI, or a combination thereof. Additionally or alternatively, signal transmission component 1135 may transmit an indication of a UE-specific configuration for the set of signals, the indication transmitted using a PDCCH, or a PDSCH, or an RRC message, or a combination thereof. In some cases, the one or more reference signals include a DMRS, or a CSI-RS, or a combination thereof. In some cases, the one or more synchronization signals include a PSS, or an SSS, or a combination thereof.

Transmit beam manager 1140 may receive, from the UE 115, an indication of a selected downlink transmit beam for transmitting downlink data and transmit the downlink data using the selected downlink transmit beam. Downlink data component 1145 may transmit a PDSCH including at least a portion of the C-RNTI, the PDSCH transmitted using the beam sweeping configuration.

Figure 12:
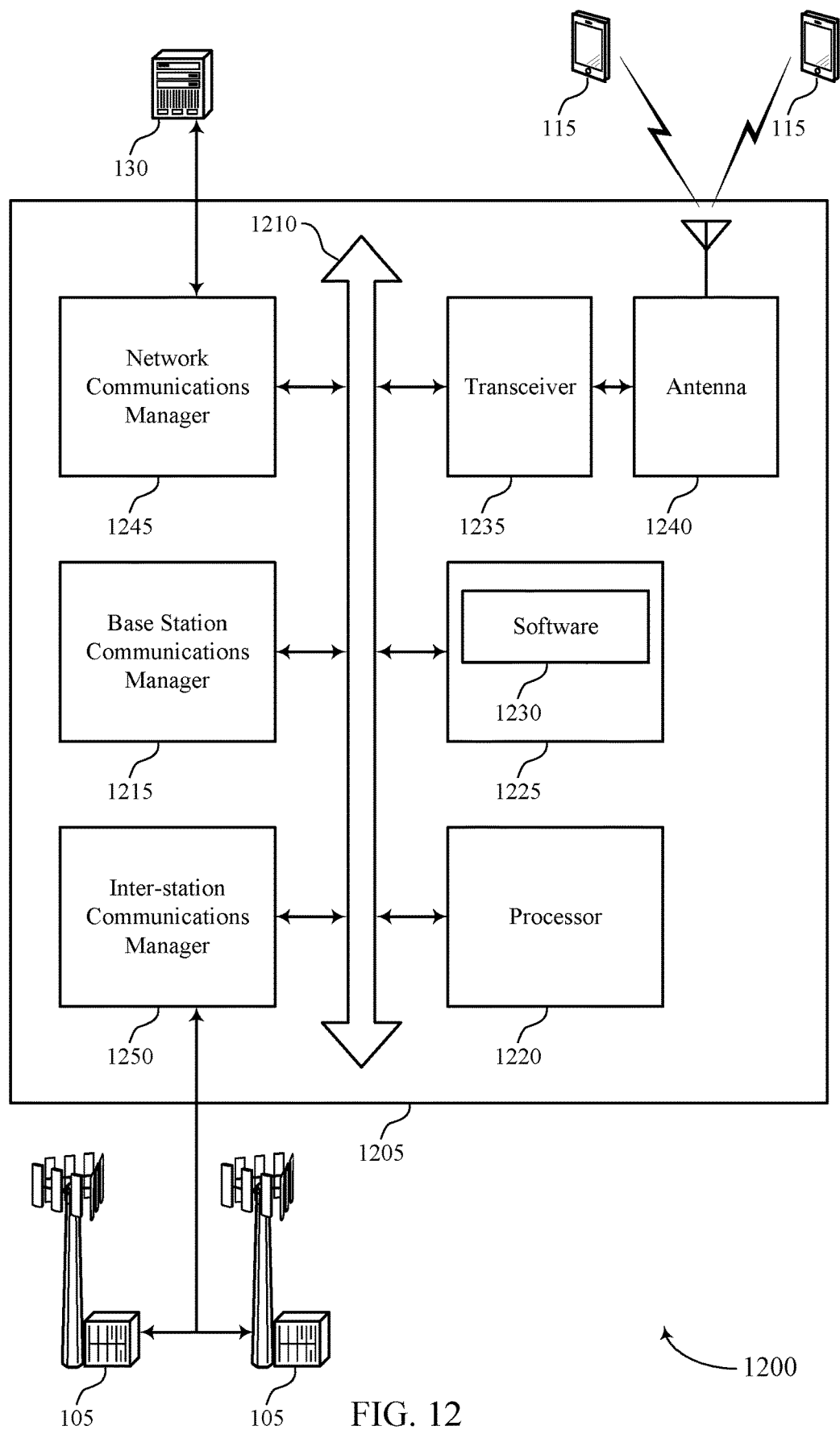
FIG. 12 illustrates a block diagram of a system including a base station in accordance with aspects of the present disclosure.

FIG. 12 shows a diagram of a system 1200 including a device 1205 in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting discontinuous reception wake up procedures).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support discontinuous reception wake up procedures. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
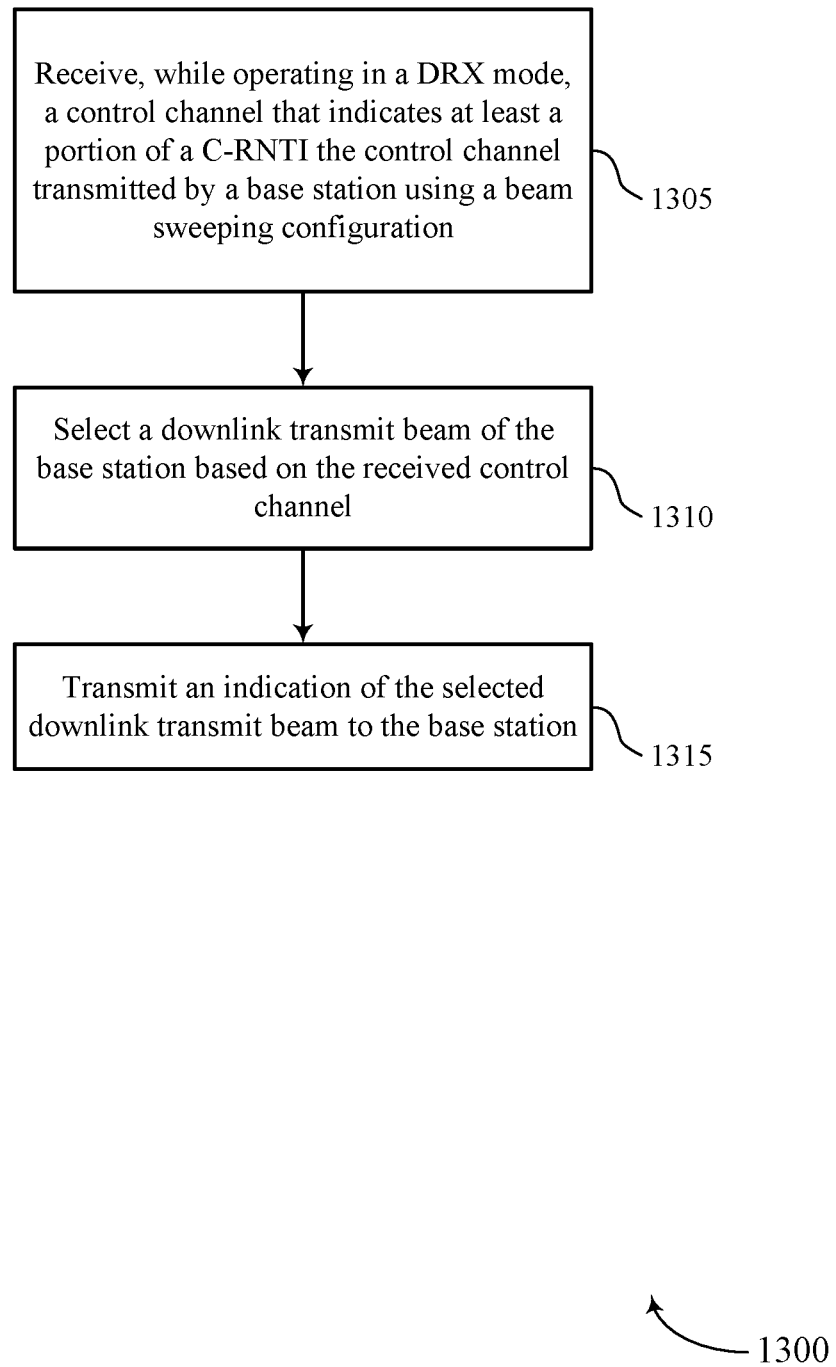
FIGS. 13 through 17 illustrate methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, while operating in a DRX mode, a control channel that indicates at least a portion of a C-RNTI of UE 115, the control channel transmitted by a base station 105 using a beam sweeping configuration. The operations of 1305 may be performed according to the methods described herein. In certain examples, aspects of the operations of 1305 may be performed by a DRX manager as described with reference to FIGS. 5 through 8.

At 1310 the UE 115 may select, by the UE 115, a downlink transmit beam of the base station 105 based on the received control channel. The operations of 1310 may be performed according to the methods described herein. In certain examples, aspects of the operations of 1310 may be performed by a beam selection component as described with reference to FIGS. 5 through 8.

At 1315 the UE 115 may transmit an indication of the selected downlink transmit beam to the base station 105. The operations of 1315 may be performed according to the methods described herein. In certain examples, aspects of the operations of 1315 may be performed by an indication manager as described with reference to FIGS. 5 through 8.

Figure 14:
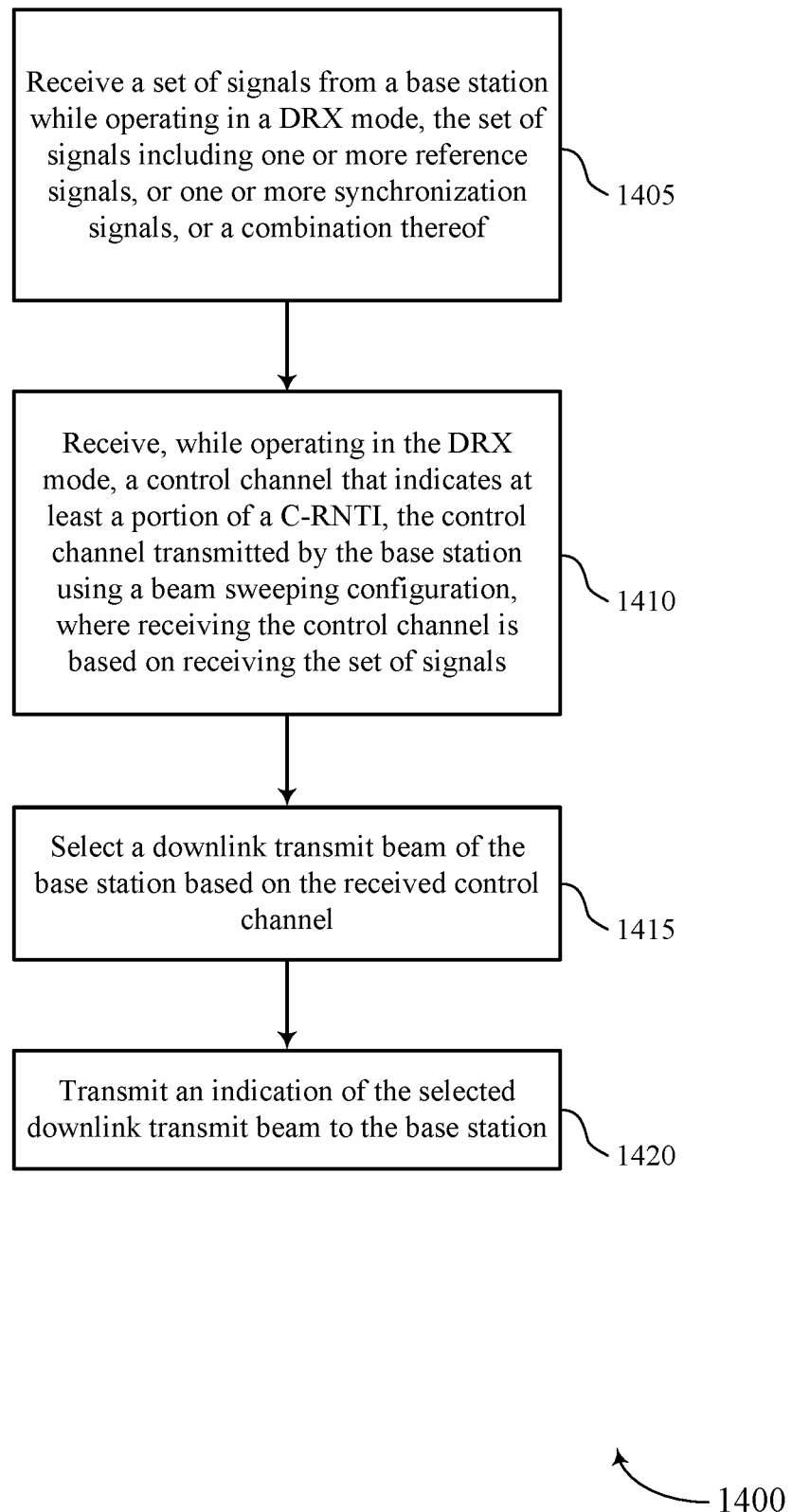

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a set of signals from a base station 105 while operating in a DRX mode, the set of signals including one or more reference signals, or one or more synchronization signals, or a combination thereof. The operations of 1405 may be performed according to the methods described herein. In certain examples, aspects of the operations of 1405 may be performed by a signal manager as described with reference to FIGS. 5 through 8.

At 1410 the UE 115 may receive, while operating in the DRX mode, a control channel that indicates at least a portion of a C-RNTI of the UE 115, the control channel transmitted by the base station 105 using a beam sweeping configuration, where receiving the control channel is based on receiving the set of signals. The operations of 1410 may be performed according to the methods described herein. In certain examples, aspects of the operations of 1410 may be performed by a DRX manager as described with reference to FIGS. 5 through 8.

At 1415 the UE 115 may select a downlink transmit beam of the base station 105 based on the received control channel. The operations of 1415 may be performed according to the methods described herein. In certain examples, aspects of the operations of 1415 may be performed by a beam selection component as described with reference to FIGS. 5 through 8.

At 1420 the UE 115 may transmit an indication of the selected downlink transmit beam to the base station 105. The operations of 1420 may be performed according to the methods described herein. In certain examples, aspects of the operations of 1420 may be performed by an indication manager as described with reference to FIGS. 5 through 8.

Figure 15:
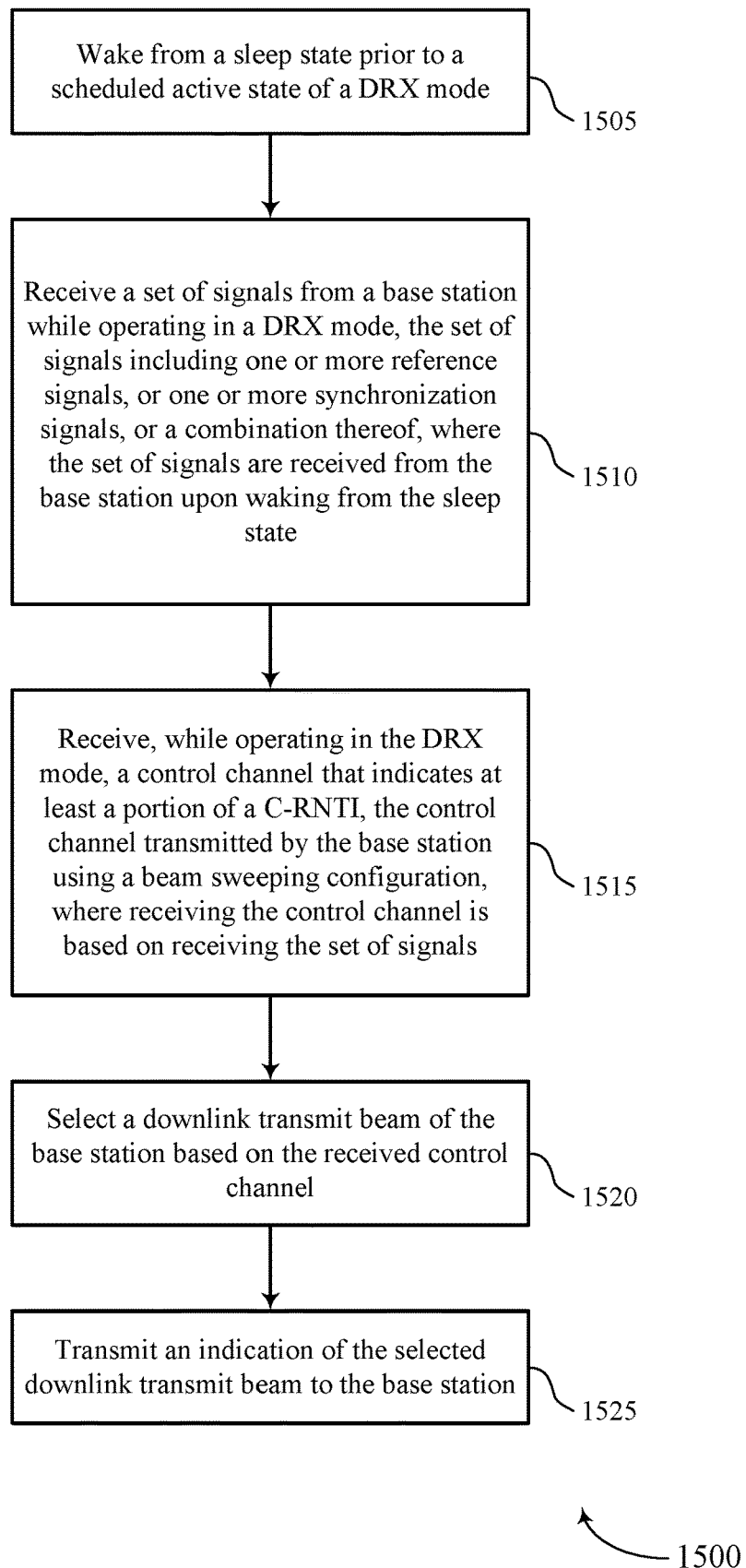

FIG. 15 shows a flowchart illustrating a method 1500 in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may wake from a sleep state prior to a scheduled active state of a DRX mode. The operations of 1505 may be performed according to the methods described herein. In certain examples, aspects of the operations of 1505 may be performed by a DRX manager as described with reference to FIGS. 5 through 8.

At 1510 the UE 115 may receive a set of signals from a base station 105 while operating in the DRX mode, the set of signals including one or more reference signals, or one or more synchronization signals, or a combination thereof, where the set of signals are received from the base station 105 upon waking from the sleep state. The operations of 1510 may be performed according to the methods described herein. In certain examples, aspects of the operations of 1510 may be performed by a signal manager as described with reference to FIGS. 5 through 8.

At 1515 the UE 115 may receive, while operating in the DRX mode, a control channel that indicates at least a portion of a C-RNTI of the UE 115, the control channel transmitted by the base station 105 using a beam sweeping configuration, where receiving the control channel is based on receiving the set of signals. The operations of 1515 may be performed according to the methods described herein. In certain examples, aspects of the operations of 1515 may be performed by a DRX manager as described with reference to FIGS. 5 through 8.

At 1520 the UE 115 may select a downlink transmit beam of the base station 105 based on the received control channel. The operations of 1520 may be performed according to the methods described herein. In certain examples, aspects of the operations of 1520 may be performed by a beam selection component as described with reference to FIGS. 5 through 8.

At 1525 the UE 115 may transmit an indication of the selected downlink transmit beam to the base station 105. The operations of 1525 may be performed according to the methods described herein. In certain examples, aspects of the operations of 1525 may be performed by an indication manager as described with reference to FIGS. 5 through 8.

Figure 16:
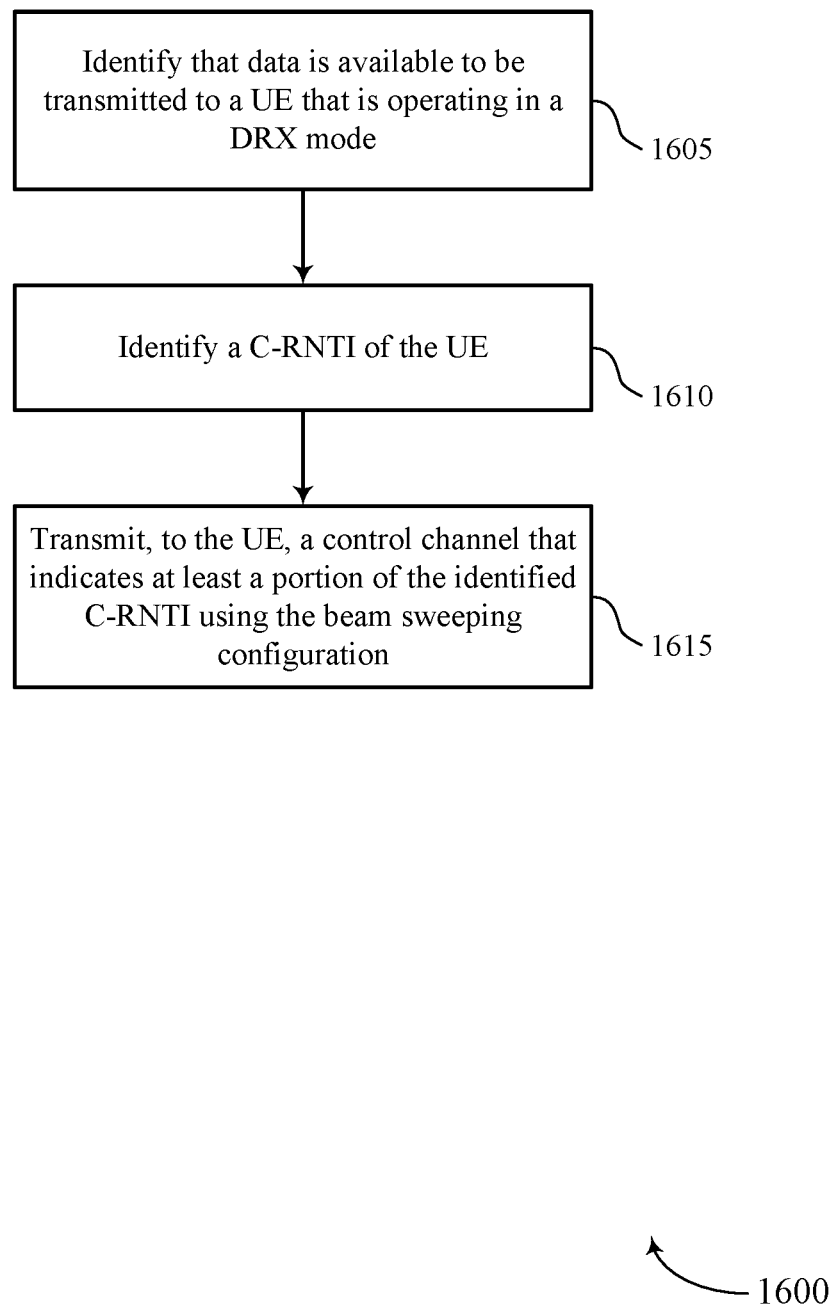

FIG. 16 shows a flowchart illustrating a method 1600 in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify that data is available to be transmitted to a UE 115 that is operating in a DRX mode. The operations of 1605 may be performed according to the methods described herein. In certain examples, aspects of the operations of 1605 may be performed by an available data manager as described with reference to FIGS. 9 through 12.

At 1610 the base station 105 may identify a C-RNTI of the UE 115. The operations of 1610 may be performed according to the methods described herein. In certain examples, aspects of the operations of 1610 may be performed by a C-RNTI identification manager as described with reference to FIGS. 9 through 12.

At 1615 the base station 105 may transmit, to the UE 115, a control channel that indicates at least a portion of the identified C-RNTI using the beam sweeping configuration. The operations of 1615 may be performed according to the methods described herein. In certain examples, aspects of the operations of 1615 may be performed by a control channel manager as described with reference to FIGS. 9 through 12.

Figure 17:
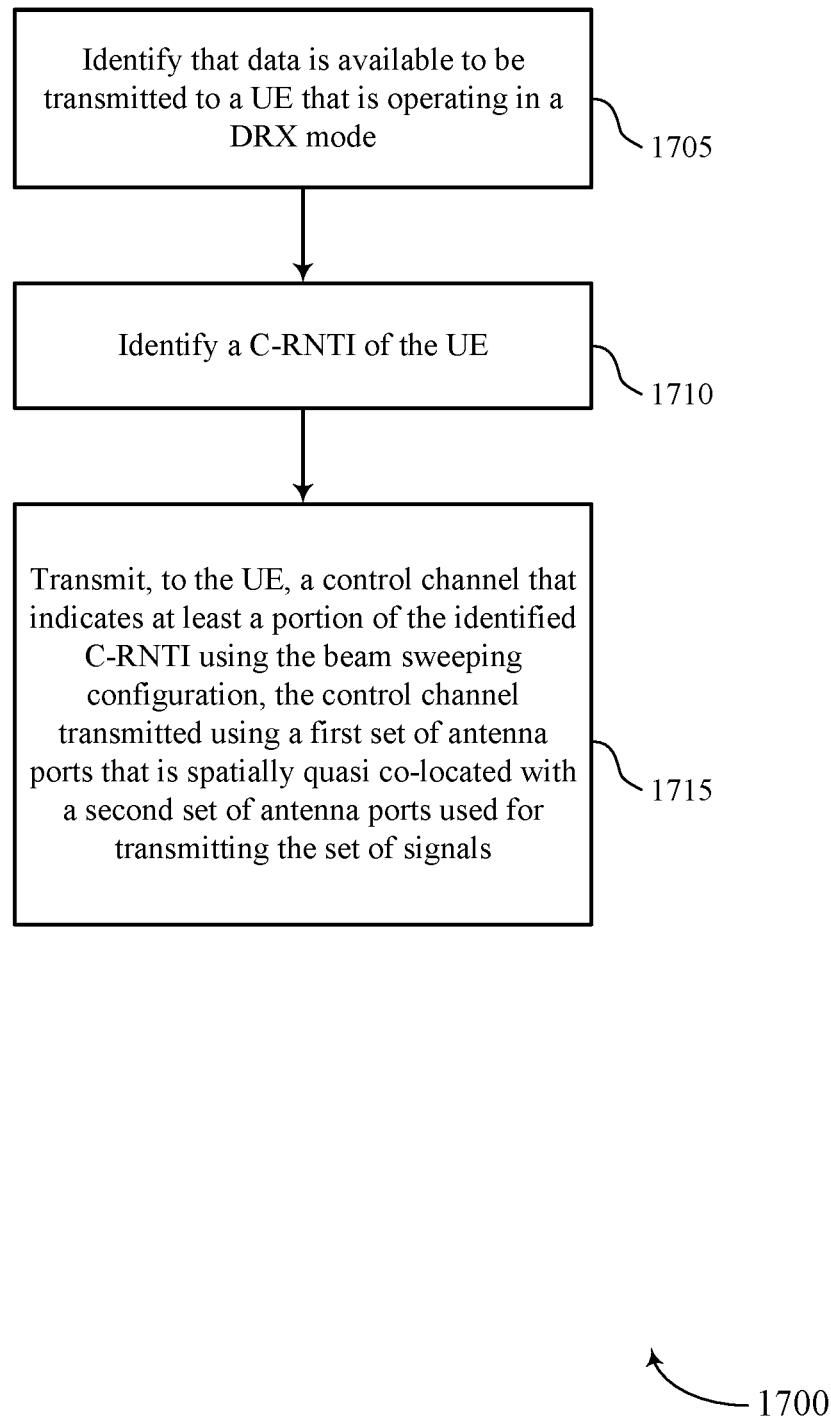

FIG. 17 shows a flowchart illustrating a method 1700 in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, the base station 105 may execute a set of codes to control the functional elements of the device to perform the functions described below. Additionally or alternatively, the base station 105 may perform aspects of the functions described below using special-purpose hardware.

At 1705 the base station 105 may identify that data is available to be transmitted to a UE 115 that is operating in a DRX mode. The operations of 1705 may be performed according to the methods described herein. In certain examples, aspects of the operations of 1705 may be performed by an available data manager as described with reference to FIGS. 9 through 12.

At 1710 the base station 105 may identify a C-RNTI of the UE 115. The operations of 1710 may be performed according to the methods described herein. In certain examples, aspects of the operations of 1710 may be performed by a C-RNTI identification manager as described with reference to FIGS. 9 through 12.

At 1715 the base station 105 may transmit, to the UE 115, a control channel that indicates at least a portion of the identified C-RNTI using the beam sweeping configuration, the control channel transmitted using a first set of antenna ports that is spatially quasi co-located with a second set of antenna ports used for transmitting the set of signals. The operations of 1715 may be performed according to the methods described herein. In certain examples, aspects of the operations of 1715 may be performed by a control channel manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA.

UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a beam-swept set of signals from a base station while operating in a discontinuous reception (DRX) mode, the beam swept set of signals comprising one or more reference signals, or one or more synchronization signals, or a combination thereof, wherein the beam-swept set of signals is received by the UE prior to a scheduled active state of the DRX mode;
receiving, while operating in the discontinuous reception (DRX) mode, a control channel that indicates at least a portion of a cell radio network temporary identifier (C-RNTI) of the UE, the control channel transmitted by the base station using a beam sweeping configuration in accordance with the DRX mode, wherein receiving the control channel is based at least in part on receiving the beam-swept set of signals and wherein the beams used for the control channel indicating C-RNTI are quasi-co-located with the beams used for the beam-swept set of signals;
selecting, by the UE, a downlink transmit beam of the base station based at least in part on the received control channel; and
transmitting an indication of the selected downlink transmit beam to the base station.

2. The method of claim 1, wherein:
identifying a beam to monitor for the at least a portion of the C-RNTI based on performing beam training for a set of receive beams based on receiving the beam-swept set of signals.

3. The method of claim 1, further comprising:
identifying a receive beam for the UE to use to receive the control channel based at least in part on the received set of signals from the base station.

4. The method of claim 1, wherein the one or more reference signals comprise a demodulation reference signal (DMRS), or a channel state information reference signal (CSI-RS), or a combination thereof, and wherein the one or more synchronization signals comprise a primary synchronization signal (PSS), or a secondary synchronization signal (SSS), or a combination thereof.

5. The method of claim 1, further comprising:
training a set of receive beams while receiving the set of signals.

6. The method of claim 5, further comprising:
training the set of receive beams while receiving the set of signals over a plurality of symbol periods.

7. The method of claim 1, further comprising:
receiving an indication of a configuration for the beam-swept set of signals, the indication received via a master information block (MIB), or a minimum system information block (MSIB), or remaining minimum system information (RMSI), or a physical downlink control channel (PDCCH), or a physical downlink shared channel (PDSCH), or a radio resource control (RRC) message, or a combination thereof.

8. The method of claim 1, wherein receiving the control channel comprises:
receiving a physical downlink control channel (PDCCH) comprising at least the portion of the C-RNTI, the PDCCH transmitted using the beam sweeping configuration.

9. The method of claim 8, further comprising:
identifying a C-RNTI of the UE; and
decoding the PDCCH using the C-RNTI.

10. The method of claim 9, wherein cyclic redundancy check (CRC) bits of the PDCCH are scrambled based at least in part on the C-RNTI.

11. The method of claim 8, further comprising:
identifying the C-RNTI in a payload of the PDCCH.

12. The method of claim 1, further comprising:
receiving a physical downlink shared channel (PDSCH) comprising at least the portion of the C-RNTI, the PDSCH transmitted using the beam sweeping configuration.

13. The method of claim 1, wherein the indication of the downlink transmit beam comprises a beam recovery signal.

14. A method for wireless communication at a base station, comprising:
transmitting a beam-swept set of signals to a user equipment (UE) operating in a discontinuous reception (DRX) mode, the beam swept set of signals comprising one or more reference signals, or one or more synchronization signals, or a combination thereof, the beam-swept set of signals received by the UE prior to a scheduled active state of the DRX mode;
identifying that data is available to be transmitted to the user equipment (UE) that is operating in the discontinuous reception (DRX) mode;
identifying a cell radio network temporary identifier (C-RNTI) of the UE; and
transmitting, to the UE, a control channel that indicates at least a portion of the identified C-RNTI and the on/off bit using a beam sweeping configuration while the UE is in a sleep state in accordance with the DRX mode, wherein transmitting the control channel is based at least in part on the beam-swept set of signals and wherein the beams used for the control channel indicating C-RNTI are quasi-co-located with the beams used for the beam-swept set of signals.

15. The method of claim 14, further comprising:
configuring the one or more reference signals as cell-specific reference signals, or UE-specific reference signals, or a combination thereof.

16. The method of claim 14, further comprising:
transmitting an indication of a configuration for the set of signals, the indication transmitted using a master information block (MIB), or a minimum system information block (MSIB), or remaining minimum system information (RMSI), or a physical downlink control channel (PDCCH), or a physical downlink shared channel (PDSCH), or a radio resource control (RRC) message, or a combination thereof.

17. The method of claim 14, wherein the one or more synchronization signals comprise a primary synchronization signal (PSS), or a secondary synchronization signal (SSS), or a combination thereof, and wherein the one or more reference signals comprise a demodulation reference signal (DMRS), or a channel state information reference signals (CSI-RS), or a combination thereof.

18. The method of claim 14, further comprising:
receiving, from the UE, an indication of a selected downlink transmit beam for transmitting downlink data; and
transmitting the downlink data using the selected downlink transmit beam.

19. The method of claim 14, wherein transmitting the control channel comprises:
transmitting a physical downlink control channel (PDCCH) comprising at least the portion of the C-RNTI, the PDCCH transmitted using the beam sweeping configuration.

20. The method of claim 19, further comprising:
encoding the PDCCH using the C-RNTI.

21. The method of claim 19, further comprising:
including the C-RNTI in a payload of the PDCCH.

22. The method of claim 14, further comprising:
transmitting a physical downlink shared channel (PDSCH) comprising at least the portion of the C-RNTI, the PDSCH transmitted using the beam sweeping configuration.

23. An apparatus for wireless communication, comprising:
a processor;
memory in electronic communication with the processor; and
instructions stored in the memory and operable, when executed by the processor, to cause the apparatus to:
receive a beam-swept set of signals from a base station while operating in a discontinuous reception (DRX) mode, the beam swept set of signals comprising one or more reference signals, or one or more synchronization signals, or a combination thereof, wherein the beam-swept set of signals is received by the UE prior to a scheduled active state of the DRX mode;
receive, while operating in the discontinuous reception (DRX) mode, a control channel that indicates at least a portion of a cell radio network temporary identifier (C-RNTI) of a user equipment (UE), the control channel transmitted by the base station using a beam sweeping configuration in accordance with the DRX mode, wherein the control channel is received based at least in part on receiving the beam-swept set of signals and wherein the beams used for the control channel indicating C-RNTI are quasi-co-located with the beams used for the beam-swept set of signals;
select, by the apparatus, a downlink transmit beam of the base station based at least in part on the received control channel; and
transmit an indication of the selected downlink transmit beam to the base station.

24. An apparatus for wireless communication, comprising:
a processor;
memory in electronic communication with the processor; and
instructions stored in the memory and operable, when executed by the processor, to cause the apparatus to:
transmit a beam-swept set of signals to a user equipment (UE) operating in a discontinuous reception (DRX) mode, the beam swept set of signals comprising one or more reference signals, or one or more synchronization signals, or a combination thereof, the beam-swept set of signals received by the UE prior to a scheduled active state of the DRX mode;
identify that data is available to be transmitted to a user equipment (UE) that is operating in a discontinuous reception (DRX) mode;
identify a cell radio network temporary identifier (C-RNTI) of the UE; and
transmit, to the UE, a control channel that indicates at least a portion of the identified C-RNTI and the on/off bit using a beam sweeping configuration while the UE is in a sleep state in accordance with the DRX mode, wherein the control channel is transmitted based at least in part on the beam-swept set of signals and wherein the beams used for the control channel indicating C-RNTI are quasi-co-located with the beams used for the beam-swept set of signals.

25. The method of claim 1, further comprising:
for a different DRX cycle, decoding or detecting the at least a portion of the C-RNTI to determine that the C-RNTI is associated with the UE;
determining that the on/off bit signal indicates no downlink data is scheduled for the UE; and
determining not to finish decoding the control channel transmission indicating the at least a portion of the C-RNTI based on the indication.

26. The method of claim 1, further comprising:
determining from an on/off bit that downlink data is scheduled for a DRX on-duration for the UE.

27. The method of claim 1, wherein receiving the control channel that indicates at least a portion of a C-RNTI of the UE comprises receiving the control channel that indicates a partial C-RNTI less than the entire C-RNTI.

28. The method of claim 14, further comprising:
generating an on/off bit to indicate that downlink data is scheduled for a DRX on-duration for the UE.

\* \* \* \* \*